United States Patent
Rose et al.

(10) Patent No.: US 6,560,338 B1
(45) Date of Patent: May 6, 2003

(54) LIMITING DELAYS ASSOCIATED WITH THE GENERATION OF ENCRYPTION STREAM CIPHERS

(75) Inventors: Gregory G. Rose, Mortlake (AU); Roy Franklin Quick, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/246,366

(22) Filed: Feb. 8, 1999

Related U.S. Application Data

(63) Continuation-in-part of application No. 09/143,441, filed on Aug. 28, 1998, now Pat. No. 6,490,357.

(51) Int. Cl.[7] .................................................. H04L 9/22

(52) U.S. Cl. ........................... 380/47; 380/42; 380/43; 380/46; 380/260; 380/261; 380/262; 380/247; 380/273; 380/277

(58) Field of Search ........................... 380/42, 43, 46, 380/260, 262, 261, 277, 273, 247, 47

(56) References Cited

U.S. PATENT DOCUMENTS

| | | | |
|---|---|---|---|
| 4,484,027 A | 11/1984 | Lee et al. ................. | 178/22.13 |
| 4,617,676 A | 10/1986 | Jayant et al. ................. | 375/27 |
| 4,769,818 A | 9/1988 | Mortimer ................. | 371/37 |
| 4,875,211 A | 10/1989 | Murai et al. ................. | 371/40.1 |
| 4,901,307 A | 2/1990 | Gilhousen et al. ................. | 370/18 |
| 5,020,060 A | 5/1991 | Murai et al. ................. | 371/37.1 |
| 5,097,499 A | 3/1992 | Cosentino ................. | 379/59 |
| 5,103,459 A | 4/1992 | Gilhousen et al. ................. | 375/1 |
| 5,132,986 A * | 7/1992 | Endo et al. ................. | 375/142 |
| 5,153,919 A | 10/1992 | Reeds, III et al. ................. | 380/44 |
| 5,172,414 A | 12/1992 | Reeds, III et al. ................. | 380/45 |
| 5,204,902 A | 4/1993 | Reeds, III et al. ................. | 380/23 |
| 5,343,481 A | 8/1994 | Kraft ................. | 371/37.1 |
| 5,414,719 A | 5/1995 | Iwaki et al. ................. | 371/37.1 |
| 5,428,628 A | 6/1995 | Hassner et al. ................. | 371/37.1 |
| 5,440,570 A | 8/1995 | Wei et al. ................. | 371/37.1 |
| 5,703,952 A | 12/1997 | Taylor ................. | 380/44 |
| 5,910,907 A | 6/1999 | Chen et al. ................. | 364/724.1 |

FOREIGN PATENT DOCUMENTS

| | | | |
|---|---|---|---|
| EP | 0615361 | 9/1994 | |
| WO | 9416509 | 7/1994 | H04L/9/26 |

OTHER PUBLICATIONS

J. Dj. Golic, "On the Security of Nonlinear Filter Generators", *Proceedings of Fast Software Encryption*, 1996 Cambridge Workshop, Springer–Variag 1996.

D. Coppersmith et al., "The Shrinking Generator", *Proc. Crypto '93*, Springer–Verlag, 1994.

(List continued on next page.)

*Primary Examiner*—Gail Hayes
*Assistant Examiner*—James Seal
(74) *Attorney, Agent, or Firm*—Philip R Wadsworth; Charles D. Brown; Kyong H. Macek

(57) ABSTRACT

A method and an apparatus for generating encryption stream ciphers are based on a recurrence relation designed to operate over finite fields larger than GF(2). A non-linear output can be obtained by using one or a combination of non-linear processes to form an output function. The recurrence relation and the output function can be selected to have distinct pair distances such that, as the shift register is shifted, no identical pair of elements of the shift register are used twice in either the recurrence relation or the output function. Under these conditions, the recurrence relation and the output function also can be chosen to optimize cryptographic security or computational efficiency. Moreover, it is another object of the present invention to provide a method of assuring that the delay that results for the encryption process does not exceed predetermined bounds. To this end the ciphering delay is measured and if the estimated delay exceeds a predetermined threshold a second ciphering method is employed to limit the accumulated delay of the ciphering operation.

20 Claims, 12 Drawing Sheets

OTHER PUBLICATIONS

K. Zeng et al., "Pseudorandom Bit Generators in Stream–Cipher Cryptography", *1991 IEEE*, pp. 8–17.

K. Shaheen, "Code Book Cipher System", *1994 IEEE*, pp. 66–71.

Lee, et al. "BRM Sequence Generators Based on the Field GF(2) for DSP Implementations" *Proceedings of 1995 IEEE International Symposium on Information Theory*: p. 48 (Sep. 17–22, 1995).

W. Meier et al., "The Self–Shrinking Generator", *Communications and Cryptography: Two Sides of One Tapestry*, R.E. Blahut et al., eds. Kluwer Academic Publishers, 1994.

B. Scheier, *Applied Cryptography, Second Edition*, pp. 385–387, 412–413, 1996.

Kencheng Zeng: "Pseudorandom Bit Generators in Stream–Cipher Cryptography" Computer, US, IEEE Computer Society, Long Beach, US, vol. 24, No. 2, (1991).

Eastlake et al. Request For Comments 1750. Network Working Group. See especially p. 10.*

Menezes et al., "Handbook of Applied Cryptography." CRC Press. 1996. pp. 195–212.*

* cited by examiner-

LIMITING DELAYS ASSOCIATED WITH THE GENERATION OF ENCRYPTION STREAM CIPHERS

This application is a continuation-in-part of U.S. Ser. No. 09/143,441, filed Aug. 28, 1998 now U.S. Pat. No. 6,490,357 issued Mar. 12, 2002 entitled "Method and Apparatus for Generating Encryption Stream Ciphers" which is pending.

BACKGROUND OF THE INVENTION

I. Field of the Invention

The present invention relates to encryption. More particularly, the present invention relates to a method and apparatus for generating encryption stream ciphers.

II. Description of the Related Art

Encryption is a process whereby data is manipulated by a random process such that the data is made unintelligible by all but the targeted recipient. One method of encryption for digitized data is through the use of stream ciphers. Stream ciphers work by taking the data to be encrypted and a stream of pseudo-random bits (or encryption bit stream) generated by an encryption algorithm and combining them, usually with the exclusive-or (XOR) operation. Decryption is simply the process of generating the same encryption bit stream and removing the encryption bit stream with the corresponding operation from the encrypted data. If the XOR operation was performed at the encryption side, the same XOR operation is also performed at the decryption side. For a secured encryption, the encryption bit stream must be computationally difficult to predict.

Many of the techniques used for generating the stream of pseudo-random numbers are based on linear feedback shift register (LFSR) over the Galois finite field of order 2. This is a special case of the Galois Finite field of order $2^n$ where n is a positive integer. For n=1, the elements of the Galois field comprise bit values zero and one. The register is updated by shifting the bits over by one bit position and calculating a new output bit. The new bit is shifted into the register. For a Fibonacci register, the output bit is a linear function of the bits in the register. For a Galois register, many bits are updated in accordance with the output bit just shifted out from the register. Mathematically, the Fibonacci and Galois register architectures are equivalent.

The operations involved in generating the stream of pseudo-random numbers, namely the shifting and bit extraction, are efficient in hardware but inefficient in software or other implementations employing a general purpose processor or microprocessor. The inefficiency increases as the length of the shift register exceeds the length of the registers in the processor used to generate the stream. In addition, for n=0, only one output bit is generated for each set of operations which, again, results in a very inefficient use of the processor.

An exemplary application which utilizes stream ciphers is wireless telephony. An exemplary wireless telephony communication system is a code division multiple access (CDMA) system. The operation of CDMA system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, and incorporated by reference herein. The CDMA system is further disclosed in U.S. Pat. No. 5,103,459, entitled SYSTEM AND METHOD FOR GENERATING SIGNAL WAVEFORMS IN A CDMA CELLULAR TELEPHONE SYSTEM, assigned to the assignee of the present invention, and incorporated by reference herein. Another CDMA system includes the GLOBALSTAR communication system for world wide communication utilizing low earth orbiting satellites. Other wireless telephony systems include time division multiple access (TDMA) systems and frequency division multiple access (FDMA) systems. The CDMA systems can be designed to conform to the "TIA/EIA/IS-95 Mobile Station-Base Station Compatibility Standard for Dual-Mode Wideband Spread Spectrum Cellular System", hereinafter referred to as the IS-95 standard. Similarly, the TDMA systems can be designed to conform to the TIA/EIA/IS-54 (TDMA) standard or to the European Global System for Mobile Communication (GSM) standard.

Encryption of digitized voice data in wireless telephony has been hampered by the lack of computational power in the remote station. This has led to weak encryption processes such as the Voice Privacy Mask used in the TDMA standard or to hardware generated stream ciphers such as the A5 cipher used in the GSM standard. The disadvantages of hardware based stream ciphers are the additional manufacturing cost of the hardware and the longer time and larger cost involved in the event the encryption process needs to be changed. Since many remote stations in wireless telephony systems and digital telephones comprise a microprocessor and memory, a stream cipher which is fast and uses little memory is well suited for these applications.

SUMMARY OF THE INVENTION

The present invention is a novel and improved method and apparatus for generating encryption stream ciphers. In accordance with the present invention, the recurrence relation is designed to operate over finite fields larger than GF(2). The linear feedback shift register used to implement the recurrence relation can be implemented using a circular buffer or sliding a window. In the exemplary embodiment, multiplications of the elements of the finite field are implemented using lookup tables. A non-linear output can be obtained by using one or a combination of non-linear processes. The stream ciphers can be designed to support multi-tier keying to suit the requirements of the applications for which the stream ciphers are used.

It is an object of the present invention to generate encryption stream ciphers using architectures which are simple to implement in a processor. In particular, more efficient implementations can be achieved by selecting a finite field which is more suited for the processor. The elements and coefficients of the recurrence relation can be selected to match the byte or word size of the processor. This allows for efficient manipulation of the elements by the processor. In the exemplary embodiment, the finite field selected is the Galois field with 256 elements ($GF(2^8)$). This results in elements and coefficients of the recurrence relation occupying one byte of memory which can be efficiently manipulated. In addition, the use of a larger finite field reduces the order of the recurrence relation. For a finite field $GF(2^n)$, the order k of the recurrence relation which encodes the same amount of states is reduced by a factor of n (or a factor of 8 for the exemplary $GF(2^8)$).

It is another object of the present invention to implement field multiplications using lookup tables. In the exemplary embodiment, a multiplication (of non-zero elements) in the field can be performed by taking the logarithm of each of the two operands, adding the logarithmic values, and exponentiating the combined logarithmic value. The logarithmic and exponential tables can be created using an irreducible polynomial. In the exemplary embodiment, the tables are precomputed and stored in memory. Similarly, a field multiplication with a constant coefficient can be performed using a simple lookup table. Again, the table can be pre-computed using the irreducible polynomial and stored in memory.

It is yet another object of the present invention to remove linearity in the output of a linear feedback shift register by the use of one or a combination of the following processes: irregular stuttering (sometimes referred to as decimation), non-linear function, multiple shift registers and combining outputs from the registers, variable feedback polynomial on one register, and other non-linear processes. In the exemplary embodiment, the non-linear output can be use to randomly control the stuttering of the shift register. Additionally, a non-linear output can be derived by performing a non-linear operation on selected elements of the shift register. Furthermore, the output from the non-linear function can be XORed with a set of constants such that the non-linear output bits are unpredictably inverted.

It is yet another object of the present invention to implement the linear feedback shift register using a circular buffer or a sliding window. With the circular buffer or sliding window implementation, the elements are not shifted within the buffer. Instead, a pointer or index is used to indicate the location of the most recently computed element. The pointer is moved as new elements are computed and shifted into the circular buffer or sliding window. The pointer wraps around when it reaches an edge.

It is yet another object of the present invention to provide stream ciphers having multi-tier keying capability. In the exemplary embodiment, the state of the shift register is first initialized with a secret key. For some communication system wherein data are transmitted over frames, a stream cipher can be generated for each frame such that erased or out of sequence frames do not disrupt the operation of the encryption process. A second tier keying process can be initialized for each frame using a frame key initialization process.

It is yet another object of the present invention to utilize a recurrence relation of maximal length so that the sequence covers a maximal number of states before repeating.

It is yet another object of the present invention to utilize a recurrence relation and output equation having distinct pair differences. Distinct pair differences ensure that, as the shift register used to implement the recurrence relation shifts, no particular pair of elements of the shift register are used twice in either the recurrence relation or in the non-linear output equation. This property removes linearity in the output from the output equation.

It is yet another object of the present invention to selectively optimize cryptographic security and computational efficiency according to the requirements of an application while maintaining distinct pair differences.

Moreover, it is another object of the present invention to provide a method of assuring that the delay that results for the encryption process does not exceed predetermined bounds. To this end the ciphering delay is measured and if the estimated delay exceeds a predetermined threshold a second ciphering method is employed to limit the accumulated delay of the ciphering operation.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Linear feedback shift register (LFSR) is based on a recurrence relation over the Galois field, where the output sequence is defined by the following recurrence relation:

$$S_{n+k} = C_{k-1}S_{n+k-1} + C_{k-2}S_{n+k-2} + \cdots + C_1 S_{n+1} + C_0 S_n, \quad (1)$$

where $S_{n+k}$ is the output element, $C_j$ are constant coefficients, k is the order of the recurrence relation, and n is an index in time. The state variables S and coefficients C are elements of the underlying finite field. Equation (1) is sometimes expressed with a constant term which is ignored in this specification.

Figure 1:
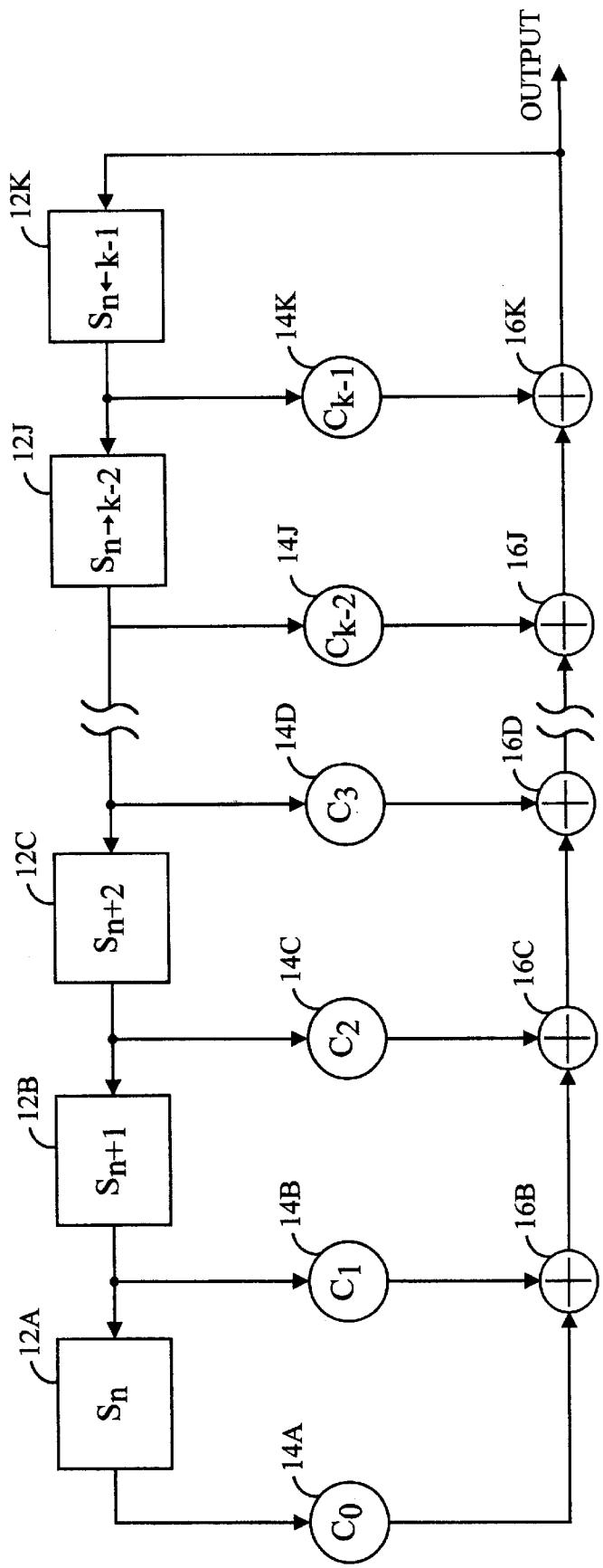
FIG. 1 is a block diagram of an exemplary embodiment of a recurrence relation.

A block diagram of an exemplary implementation of the recurrence relation in equation (1) is illustrated in FIG. 1. For a recurrence relation of order k, register 12 comprises k elements $S_n$ to $S_{n+k-1}$. The elements are provided to Galois field multipliers 14 which multiplies the elements with the constants $C_j$. The resultant products from multipliers 14 are provided Galois field adders 16 which sum the products to provide the output element.

For n=1, the elements of GF(2) comprise a single bit (having a value of 0 or 1) and implementation of equation (1) requires many bit-wise operations. In this case, the implementation of the recurrence relation using a general purpose processor is inefficient because a processor which is designed to manipulate byte or word sized objects is utilized to perform many operations on single bits.

In the present invention, the linear feedback shift register is designed to operate over finite fields larger than GF(2). In particular, more efficient implementations can be achieved by selecting a finite field which is more suited for a processor. In the exemplary embodiment, the finite field selected is the Galois field with 256 elements ($GF(2^8)$) or other Galois fields with $2^n$ elements, where n is the word size of the processor.

In the preferred embodiment, a Galois field with 256 elements ($GF(2^8)$) is utilized. This results in each element and coefficient of the recurrence relation occupying one byte of memory. Byte manipulations can be performed efficiently by the processor. In addition, the order k of the recurrence relation which encodes the same amount of states is reduced by a factor of n, or 8 for $GF(2^8)$.

In the present invention, a maximal length recurrence relation is utilized for optimal results. Maximal length refers to the length of the output sequence (or the number of states of the register) before repeating. For a recurrence relation of order k, the maximal length is $N^k-1$, where N is the number of elements in the underlying finite field, and N=256 in the preferred embodiment. The state of all zeros is not allowed.

Figure 2:
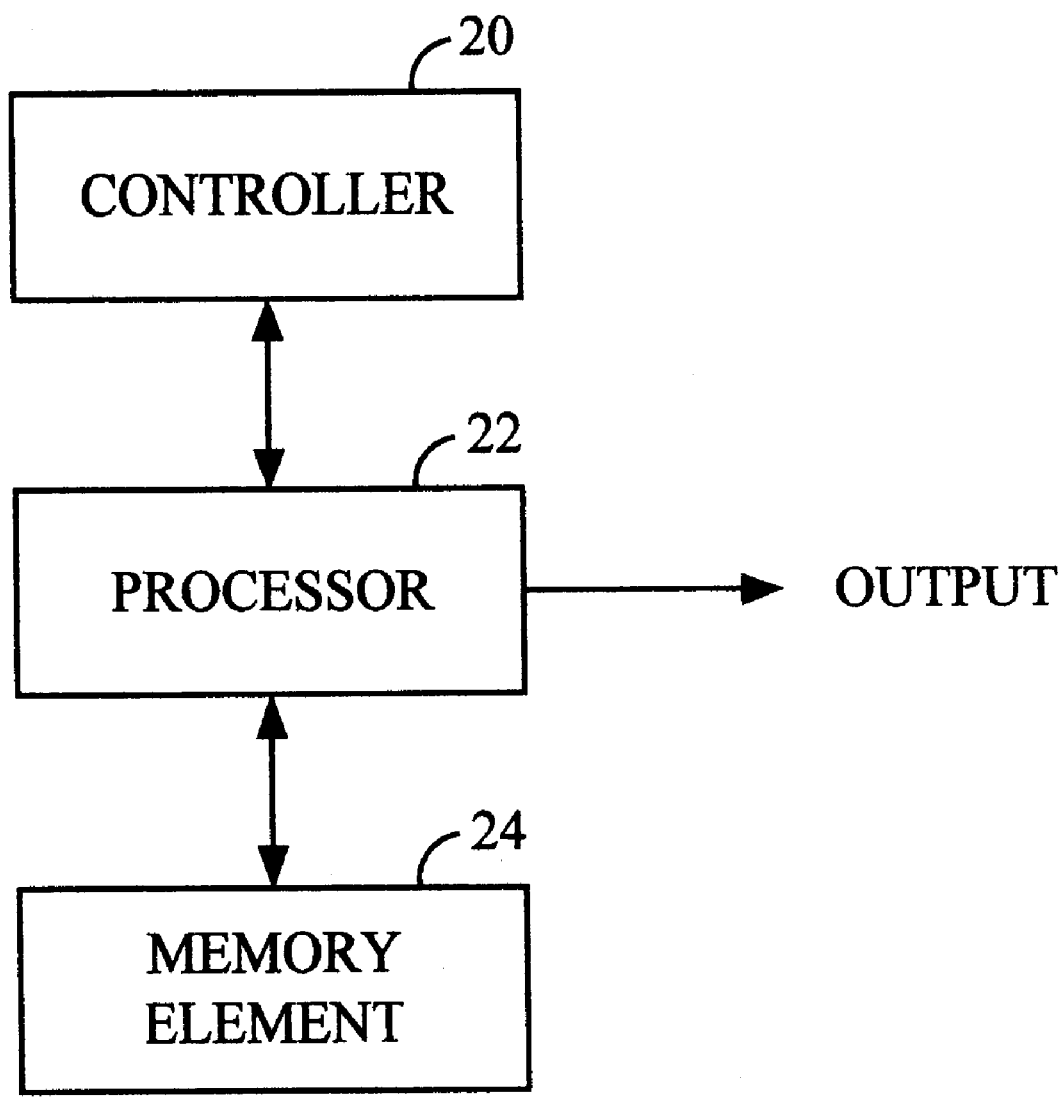
FIG. 2 is a exemplary block diagram of an stream cipher generator utilizing a processor.

An exemplary block diagram of a stream cipher generator utilizing a processor is shown in FIG. 2. Controller 20 connects to processor 22 and comprises the set of instructions which directs the operation of processor 22. Thus, controller 20 can comprise a software program or a set of microcodes. Processor 22 is the hardware which performs the manipulation required by the generator. Processor 22 can be implemented as a microcontroller, a microprocessor, or a digital signal processor designed to performed the functions described herein. Memory element 24 connects to processor 22 and is used to implement the linear feedback shift register and to store pre-computed tables and instructions which are described below. Memory element 24 can be implemented with random-access-memory or other memory devices designed to perform the functions described herein. The instructions and tables can be stored in read-only memory, only the memory for the register itself needs to be modified during the execution of the algorithm.

I. Generating Non-Linear Output Stream

The use of linear feedback shift register for stream ciphers can be difficult to implement properly. This is because any linearity remaining in the output stream can be exploited to derive the state of the register at a point in time. The register can then be driven forward or backward as desired to recover the output stream. A number of techniques can be used to generate non-linear stream ciphers using linear feedback shift register. In the exemplary embodiment, these non-linear techniques comprise stuttering (or unpredictable decimation) of the register, the use of a non-linear function on the state of the register, the use of multiple registers and non-linear combination of the outputs of the registers, the use of variable feedback polynomials on one register, and other non-linear processes. These techniques are each described below. Some of the techniques are illustrated by the example below. Other techniques to generate non-linear stream ciphers can be utilized and are within the scope of the present invention.

Stuttering is the process whereby the register is clocked in a variable and unpredictable manner. Stuttering is simple to implement and provides good results. With stuttering, the output associated with some states of the register are not provided at the stream cipher, thus making it more difficult to reconstruct the state of the register from the stream cipher.

Using a non-linear function on the state of the shift register can also provide good results. For a recurrence relation, the output element is generated from a linear function of the state of the register and the coefficients, as defined by equation (1). To provide non-linearity, the output element can be generated from a non-linear function of the state of the register. In particular, non-linear functions which operate on byte or word sized data on general purpose processors can be utilized.

Using multiple shift registers and combining the outputs from the registers in a non-linear fashion can provide good results. Multiple shift registers can be easily implemented in hardware where additional cost is minimal and operating the shift registers in parallel to maintain the same operating speed is possible. For implementations on a general purpose processor, a single larger shift register which implements a function similar to the function of the multiple shift registers can be utilized since the larger shift register can be updated in a constant time (without reducing the overall speed).

Using a variable feedback polynomial which changes in an unpredictable manner on one register can also provide good results. Different polynomials can be interchanged in a random order or the polynomial can be altered in a random manner. The implementation of this technique can be simple if properly designed.

II. Operations on Elements of Larger Order Finite Fields

The Galois field $GF(2^8)$ comprises 256 elements. The elements of Galois field Sib $GF(2^8)$ can be represented in one of several different ways. A common and standard representation is to form the field from the coefficients modulo 2 of all polynomials with degree less than 8. That is, the elements of the field can be represented by a byte with bits $(a_7, a_6, \ldots, a_0)$ which represent the polynomial:

$$a_7 x^7 + a_6 x^6 + \cdots + a_1 x + a_0. \quad (2)$$

The bits are also referred to as the coefficients of the polynomial. The addition operation on two polynomials represented by equation (2) can be performed by addition modulo two for each of the corresponding coefficients ($a_7, a_6, \ldots, a_0$). Stated differently, the addition operation on two bytes can be achieved by performing the exclusive-OR on the two bytes. The additive identity is the polynomial with all zero coefficients $(0, 0, \ldots, 0)$.

Multiplication in the field can be performed by normal polynomial multiplication with modulo two coefficients. However, multiplication of two polynomials of order n produces a resultant polynomial of order (2n−1) which needs to be reduced to a polynomial of order n. In the exemplary embodiment, the reduction is achieved by dividing the resultant polynomial by an irreducible polynomial, discarding the quotient, and retaining the remainder as the reduced polynomial. The selection of the irreducible polynomial alters the mapping of the elements of the group into encoded bytes in memory, but does not otherwise affect the actual group operation. In the exemplary embodiment, the irreducible polynomial of degree 8 is selected to be:

$$x^8 + x^6 + x^3 + x^2 + 1. \quad (3)$$

Other irreducible monic polynomials of degree 8 can also be used and are within the scope of the present invention. The multiplicative identity element is $(a_7, a_6, \ldots, a_0)=(0, 0, \ldots, 1)$.

Polynomial multiplication and the subsequent reduction are complicated operations on a general purpose processor. However, for Galois fields having a moderate number of elements, these operations can be performed by lookup tables and more simple operations. In the exemplary embodiment, a multiplication (of non-zero elements) in the field can be performed by taking the logarithm of each of the two operands, adding the logarithmic values modulo 255, and exponentiating the combined logarithmic value. The reduction can be incorporated within the lookup tables.

The exponential and logarithm tables can be generated as follows. First, a generator g of the multiplicative subgroup $GF(2^8)$ is determined. In this case, the byte value g=2 (representing the polynomial x) is a generator. The exponential table, shown in Table 1, is a 256-byte table of the values $g^i$, for i=0, 1, ... $2^8-1$. For $g^i$ (considered as an integer) of less than 256, the value of the exponential is as expected as evidenced by the first eight entries in the first row of Table 1. Since g=2, each entry in the table is twice the value of the entry to the immediate left (taking into account the fact that Table 1 wraps to the next row). However, for each $g^i$ greater than 255, the exponential is reduced by the irreducible polynomial shown in equation (3). For example, the exponential $x^8$ (first. row, ninth column) is reduced by the irreducible polynomial $x^8+x^6+x^3+x^2+1$ to produce the remainder $-x^6-x^3-x^2-1$. This remainder is equivalent to $x^6+x^3+x^2+1$ for modulo two operations and is represented as 77 ($2^6+2^3+2^2+1$) in Table 1. The process is repeated until $g^i$ for all index i=0 to 255 are computed.

Having defined the exponential table, the logarithm table can be computed as the inverse of the exponential table. In Table 1, there is a unique one to one mapping of the exponential value $g^i$ for each index i which results from using an irreducible polynomial. For Table 1, the mapping is i⇔$2^i$, or the value stored in the i-th location is $2^1$. Taking $\log_2$ of both sides results in the following: $\log_2(i)$⇔i. These two mappings indicate that if the content of the i-th location in the exponential table is used as the index of the logarithm table, the log of this index is the index of the exponential table. For example, for i=254, the exponential value $2^i=2^{254}=166$ as shown in the last row, fifth column in Table 1. Taking $\log_2$ of both sides yields 254=$\log_2(166)$. Thus, the entry for the index i=166 in the logarithmic table is set to 254. The process is repeated until all entries in the logarithmic table have been mapped. The log of 0 is an undefined number. In the exemplary embodiment, a zero is used as a place holder.

Having defined the exponential and logarithmic tables, a multiplication (of non-zero elements) in the field can be performed by looking up the logarithmic of each of the two operands in the logarithmic table, adding the logarithmic values using modulo 255, and exponentiating the combined logarithmic value by looking up the exponential table. Thus, the multiplication operation in the field can be performed with three lookup operations and a truncated addition. In the exemplary Galois field $GF(2^8)$, each table is 255 bytes long and can be pre-computed and stored in memory. In the exemplary embodiment, the logarithm table has an unused entry in position 0 to avoid the need to subtract 1 from the indexes. Note that when either operand is a zero, the corresponding entry in the logarithmic table does not represent a real value. To provide the correct result, each operand needs to be tested to see if it is zero, in which case the result is 0, before performing the multiplication operation as described.

For the generation of the output element from a linear feedback shift register using a recurrence relation, the situation is simpler since the coefficients $C_j$ are constant as shown in equation (1). For efficient implementation, these coefficients are selected to be 0 or 1 whenever possible. Where $C_j$ have values other than 0 or 1, a table can be pre-computed for the multiplication $t_i=C_j \cdot i$, where i=0, 1, 2, ..., $2^8-1$. In this case, the multiplication operation can be performed with a single table lookup and no tests. Such a table is fixed and can be stored in read-only memory.

TABLE 1

| | Exponential Table | | | | | | | | | |
|---|---|---|---|---|---|---|---|---|---|---|
| i | xx0 | xx1 | xx2 | xx3 | xx4 | xx5 | xx6 | xx7 | xx8 | xx9 |
| 00x | 1 | 2 | 4 | 8 | 16 | 32 | 64 | 128 | 77 | 154 |
| 01x | 121 | 242 | 169 | 31 | 62 | 124 | 248 | 189 | 55 | 110 |
| 02x | 220 | 245 | 167 | 3 | 6 | 12 | 24 | 48 | 96 | 192 |
| 03x | 205 | 215 | 227 | 139 | 91 | 182 | 33 | 66 | 132 | 69 |
| 04x | 138 | 89 | 178 | 41 | 82 | 164 | 5 | 10 | 20 | 40 |
| 05x | 80 | 160 | 13 | 26 | 52 | 104 | 208 | 237 | 151 | 99 |
| 06x | 198 | 193 | 207 | 211 | 235 | 155 | 123 | 246 | 161 | 15 |
| 07x | 30 | 60 | 120 | 240 | 173 | 23 | 46 | 92 | 184 | 61 |
| 08x | 122 | 244 | 165 | 7 | 14 | 28 | 56 | 112 | 224 | 141 |
| 09x | 87 | 174 | 17 | 34 | 68 | 136 | 93 | 186 | 57 | 114 |
| 10x | 228 | 133 | 71 | 142 | 81 | 162 | 9 | 18 | 36 | 72 |
| 11x | 144 | 109 | 218 | 249 | 191 | 51 | 102 | 204 | 213 | 231 |
| 12x | 131 | 75 | 150 | 97 | 194 | 201 | 223 | 243 | 171 | 27 |
| 13x | 54 | 108 | 216 | 253 | 183 | 35 | 70 | 140 | 85 | 170 |
| 14x | 25 | 50 | 100 | 200 | 221 | 247 | 163 | 11 | 22 | 44 |
| 15x | 88 | 176 | 45 | 90 | 180 | 37 | 74 | 148 | 101 | 202 |
| 16x | 217 | 255 | 179 | 43 | 86 | 172 | 21 | 42 | 84 | 168 |
| 17x | 29 | 58 | 116 | 232 | 157 | 119 | 238 | 145 | 111 | 222 |
| 18x | 241 | 175 | 19 | 38 | 76 | 152 | 125 | 250 | 185 | 63 |
| 19x | 126 | 252 | 181 | 39 | 78 | 156 | 117 | 234 | 153 | 127 |
| 20x | 254 | 177 | 47 | 94 | 188 | 53 | 106 | 212 | 229 | 135 |
| 21x | 67 | 134 | 65 | 130 | 73 | 146 | 105 | 210 | 233 | 159 |
| 22x | 115 | 230 | 129 | 79 | 158 | 113 | 226 | 137 | 95 | 190 |
| 23x | 49 | 98 | 196 | 197 | 199 | 195 | 203 | 219 | 251 | 187 |
| 24x | 59 | 118 | 236 | 149 | 103 | 206 | 209 | 239 | 147 | 107 |
| 25x | 214 | 225 | 143 | 83 | 166 | | | | | |

TABLE 2

Logarithmic Table

| i | xx0 | xx1 | xx2 | xx3 | xx4 | xx5 | xx6 | xx7 | xx8 | xx9 |
|---|---|---|---|---|---|---|---|---|---|---|
| 00x | 0 | 0 | 1 | 23 | 2 | 46 | 24 | 83 | 3 | 106 |
| 01x | 47 | 147 | 25 | 52 | 84 | 69 | 4 | 92 | 107 | 182 |
| 02x | 48 | 166 | 148 | 75 | 26 | 140 | 53 | 129 | 85 | 170 |
| 03x | 70 | 13 | 5 | 36 | 93 | 135 | 108 | 155 | 183 | 193 |
| 04x | 49 | 43 | 167 | 163 | 149 | 152 | 76 | 202 | 27 | 230 |
| 05x | 141 | 115 | 54 | 205 | 130 | 18 | 86 | 98 | 171 | 240 |
| 06x | 71 | 79 | 14 | 189 | 6 | 212 | 37 | 210 | 94 | 39 |
| 07x | 136 | 102 | 109 | 214 | 156 | 121 | 184 | 8 | 194 | 223 |
| 08x | 50 | 104 | 44 | 253 | 168 | 138 | 164 | 90 | 150 | 41 |
| 09x | 153 | 34 | 77 | 96 | 203 | 228 | 28 | 123 | 231 | 59 |
| 10x | 142 | 158 | 116 | 244 | 55 | 216 | 206 | 249 | 131 | 111 |
| 11x | 19 | 178 | 87 | 225 | 99 | 220 | 172 | 196 | 241 | 175 |
| 12x | 72 | 10 | 80 | 66 | 15 | 186 | 190 | 199 | 7 | 222 |
| 13x | 213 | 120 | 38 | 101 | 211 | 209 | 95 | 227 | 40 | 33 |
| 14x | 137 | 89 | 103 | 252 | 110 | 177 | 215 | 248 | 157 | 243 |
| 15x | 122 | 58 | 185 | 198 | 9 | 65 | 195 | 174 | 224 | 219 |
| 16x | 51 | 68 | 105 | 146 | 45 | 82 | 254 | 22 | 169 | 12 |
| 17x | 139 | 128 | 165 | 74 | 91 | 181 | 151 | 201 | 42 | 162 |
| 18x | 154 | 192 | 35 | 134 | 78 | 188 | 97 | 239 | 204 | 17 |
| 19x | 229 | 114 | 29 | 61 | 124 | 235 | 232 | 233 | 60 | 234 |
| 20x | 143 | 125 | 159 | 236 | 117 | 30 | 245 | 62 | 56 | 246 |
| 21x | 217 | 63 | 207 | 118 | 250 | 31 | 132 | 160 | 112 | 237 |
| 22x | 20 | 144 | 179 | 126 | 88 | 251 | 226 | 32 | 100 | 208 |
| 23x | 221 | 119 | 173 | 218 | 197 | 64 | 242 | 57 | 176 | 247 |
| 24x | 73 | 180 | 11 | 127 | 81 | 21 | 67 | 145 | 16 | 113 |
| 25x | 187 | 238 | 191 | 133 | 200 | 161 | | | | |

III. Memory Implementation

When implemented in hardware, shifting bits is a simple and efficient operation. Using a processor and a shift register larger than the registers of the processor makes shifting bits is an iterative procedure which is very inefficient. When the units to be shifted are bytes or words, shifting becomes simpler because there is no carry between bytes. However, the shifting process is still iterative and inefficient.

Figure 3A:
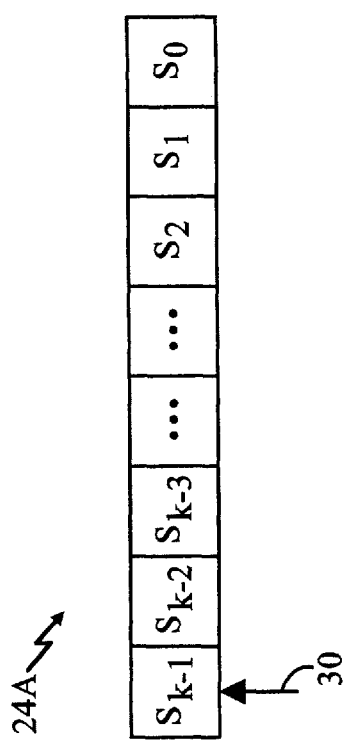
FIGS. 3A and 3B are diagrams showing the contents of a circular buffer at time n and time n+1, respectively.
Figure 3B:
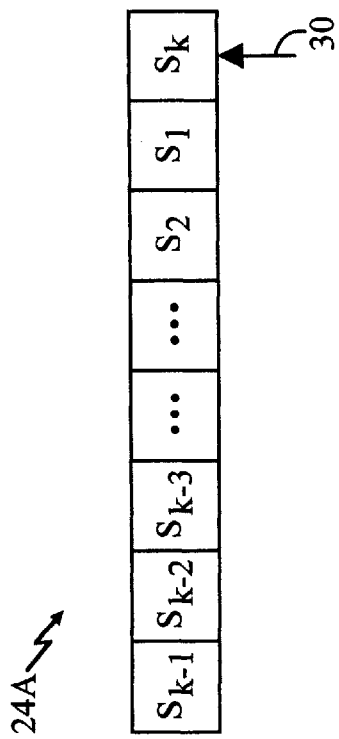

In the exemplary embodiment, the linear feedback shift register is implemented with a circular buffer or a sliding window. The diagrams showing the contents of circular buffer 24a at time n at time n+1 are shown in FIGS. 3A and 3B, respectively. For circular buffer 24a, each element of the shift register is stored in a corresponding location in memory. A single index, or pointer 30, maintains the memory location of the most recent element stored in memory, which is $S_{k-1}$ in FIG. 3A. At time n+1, the new element $S_k$ is computed and stored over the oldest element $S_0$ in memory, as shown in FIG. 3B. Thus, instead of shifting all elements in memory, pointer 30 is moved to the memory location of the new element $S_k$. When pointer 30 reaches the end of circular buffer 24a, it is reset to the beginning (as shown in FIGS. 3A and 3B). Thus, circular buffer 24a acts as if it is a circle and not a straight line.

Circular buffer 24a can be shifted from left-to-right, or right-to-left as shown in FIGS. 3A and 3B. Correspondingly, pointer 30 can move left-to-right, or right-to-left as shown in FIGS. 3A and 3B. The choice in the direction of the shift is a matter of implementation style and does not affect the output result.

To generate an output element in accordance with a recurrence relation, more than one elements are typically required from memory. The memory location associated with each required element can be indicated by a separate pointer which is updated when the register is shifted. Alternatively, the memory location associated with each required element can be computed from pointer 30 as necessary. Since there is a one-to-one mapping of each element to a memory location, a particular element can be obtained by determining the offset of that element from the newest element (in accordance with the recurrence relation), adding that offset to pointer 30, and addressing the memory location indicated by the updated pointer. Because of the circular nature of the memory, the calculation of the updated pointer is determined by an addition modulo k of the offset to pointer 30. Addition modulo k is simple when k is a power of two but is otherwise an inefficient operation on a processor.

Figure 3C:
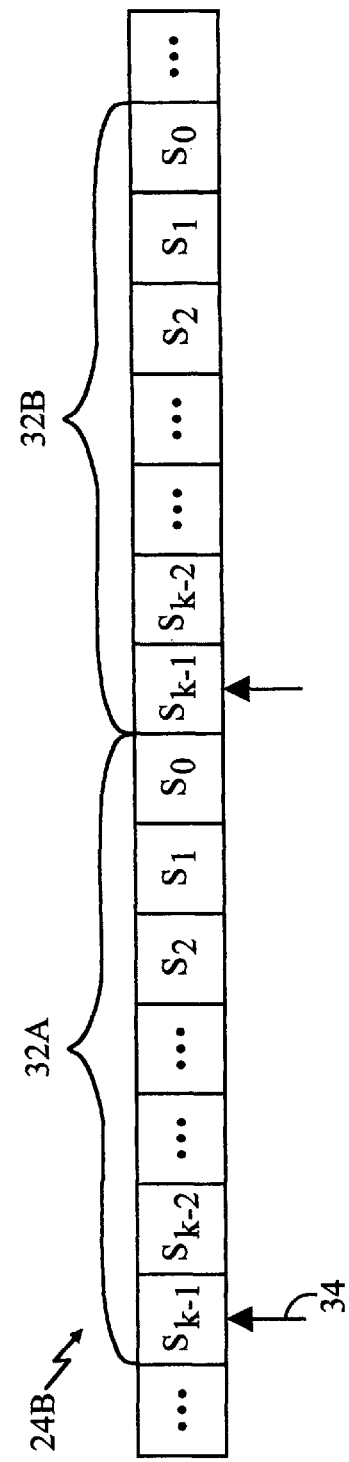
FIG. 3C is a diagram showing the content of a sliding window.

In the preferred embodiment, the shift register is implemented with sliding window 24b as shown in FIG. 3C. Sliding window 24b is at least twice as long as circular buffer 24a and comprises two circular buffers 32a and 32b arranged adjacent to each other. Each of circular buffers 32a and 32b behaves like circular 24a described above. Circular buffer 32b is an exact replica of circular buffer 32a. In normal operation, buffer 32b contains meaningful values. Values stored in buffer 32a are then calculated from the values in buffer 32b. Thus, each element of the shift register is stored in two corresponding locations in memory, one each for circular buffers 32a and 32b. Pointer 34 maintains the memory location of the most recent element stored in circular buffer 32a, which is $S_{k-1}$ in FIG. 3C. In the exemplary embodiment, pointer 34 starts at the middle of sliding window 24b, moves right-to-left, and resets to the middle again when it reaches the end on the left side.

From FIG. 3C, it can be observed that no matter where in circular buffer 32a pointer 34 appears, the previous k−1 elements can be addressed to the right of pointer 34. Thus, to address an element in the shift register in accordance with the recurrence relation, an offset of k−1 or less is added to pointer 34. Addition modulo k is not required since the updated pointer is always to the right of pointer 34 and computational efficiency is obtained. For this implementation, sliding window 24b can be of any length at least twice as long as circular buffer 24a, with any excess bytes being ignored. Furthermore, the update time is constant and short.

IV. Exemplary Stream Cipher Based on LFSR Over $GF(2^8)$

The present invention can be best illustrated by an exemplary generator for a stream cipher based on a linear feedback shift register over $GF(2^8)$. The stream cipher described below uses the byte operations described above over the Galois field of order 8 with the representation of $\oplus$ and $\otimes$ for operations of addition and multiplication, respectively, over the Galois field. In the exemplary embodiment, table lookup is utilized for the required multiplication with constants $C_j$. In the exemplary embodiment, a sliding window is used to allow fast updating of the shift register.

Figure 4:
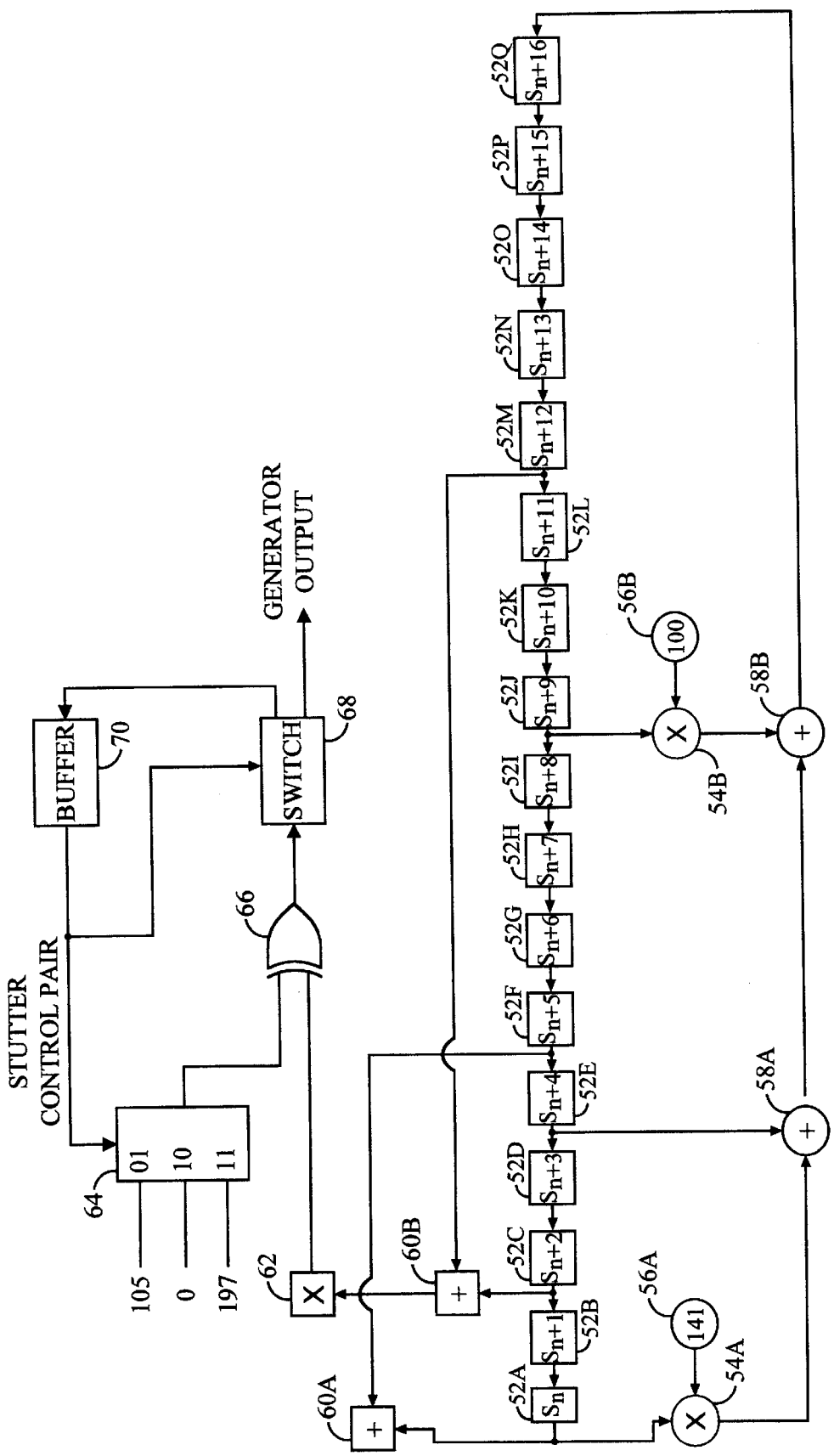
FIG. 4 is a block diagram of an exemplary stream cipher generator of the present invention.

A block diagram of the exemplary generator is shown in FIG. 4. In the exemplary embodiment, linear feedback shift register 52 is 17 octets (or 136 bits) long which allows shift register 52 to be in $2^{136}-1$ (or approximately $8.7 \times 10^{40}$) states. The state where the entire register is 0 is not a valid state and does not occur from any other state. The time to update register 52 with a particular number of non-zero elements in the recurrence relation is constant irrespective of the length of register 52. Thus, additional length for register 52 (for higher order recurrence relation) can be implemented at a nominal cost of extra bytes in memory.

In the exemplary embodiment, linear feedback shift register 52 is updated in accordance with the following recurrence relation:

$$S_{n+17} = (100 \otimes S_{n+9}) \oplus S_{n+4} \oplus (141 \otimes S_n) \quad (4)$$

where the operations are defined over $GF(2^8)$, $\oplus$ is the exclusive-OR operation on two bytes represented by Galois adders 58, and $\otimes$ is a polynomial modular multiplication represented by Galois multipliers 54 (see FIG. 4). In the exemplary embodiment, the modular multiplications on coefficients 56 are implemented using byte table lookups on pre-computed tables as described above. In the exemplary embodiment, the polynomial modular multiplication table is computed using the irreducible polynomial defined by equation (3). The recurrence relation in equation (4) was chosen to be maximal length, to have few non-zero coefficients, and so that the shift register elements used were distinct from ones used for the non-linear functions below.

In the exemplary embodiment, to disguise the linearity of shift register 52, two of the techniques described above are used, namely stuttering and using a non-linear function. Additional non-linearity techniques are utilized and are described below. In the exemplary embodiment, non-linearity is introduced by performing a non-linear operation on multiple elements of shift register 52 are combined using a function which is non-linear. An exemplary non-linear function is the following:

$$V_n = (S_n + S_{n+5}) \times (S_{n+2} + S_{n+12}), \quad (5)$$

where $V_n$ is the non-linear output (or the generator output), + is the addition truncated modulo 256 represented by arithmetic adders 60, and × is the multiplication modulo 257 represented by modular multiplier 62 and described below. In the exemplary embodiment, the four bytes used are $S_n$, $S_{n+2}$, $S_{n+5}$ and $S_{n+12}$, where $S_n$ is the oldest calculated element in the sequence according to the recurrence relation in equation (4). These elements are selected such that, as the register shifts, no two elements are used in the computation of two of the generator outputs. The pairwise distances between these elements are distinct values. For example, $S_{n+12}$ is not combined with $S_{n+5}$, $S_{n+2}$, nor $S_n$ again as it is shifted through register 52. This property is referred to as a "full positive difference set."

Simple byte addition, with the result truncated modulo 256, is made non-linear in $GF(2^8)$ by the carry between bits. In the exemplary embodiment, two pairs of elements in the register $\{(S_n \text{ and } S_{n+5}) \text{ and } (S_{n+2} \text{ and } S_{n+12})\}$ are combined using addition modulo 256 to yield two intermediate results. however, addition modulo 256 is not ideal since the least significant bits have no carry input and are still combined linearly.

Another non-linear function which can be computed conveniently on a processor is multiplication. However, truncation of a normal multiplication into a single byte may not yield good result because multiplication modulo 256 does not form a group since the results are not well distributed within the field. A multiplicative group of the field of integers modulo the prime number 257 can be used. This group consists of integers in the range of 1 to 256 with the group operation being integer multiplication reduced modulo 257. Note that the value 0 does not appear in the group but the value 256 does. In the exemplary embodiment, the value of 256 can be represented by a byte value of 0.

Typically, processors can perform multiplication instructions efficiently but many have no capability to perform, or to perform efficiently, divide or modulus instructions. Thus, the modulo reduction by 257 can represent a performance bottleneck. However, reduction modulo 257 can be computed using computation modulo $2^n$, which in the case of n=8 is efficient on common processors. It can be shown that for a value X in the range of 1 to $2^{16}-1$ (where X is the result of a multiplication of two 8th order operands), reduction modulo 257 can be computed as:

$$X_{257} = \left\{ X_{256} - \frac{X}{256} \right\}_{257}$$

where $X_{257}$ is the reduction modulo 257 of X and $X_{256}$ is the reduction modulo 256 of X. Equation (6) indicates that reduction modulo 257 of a 16-bit number can be obtained by subtracting the 8 most significant bits (X/256) from the 8 least significant bits ($X_{256}$). The result of the subtraction is in the range of −255 and 255 and may be negative. If the result is negative, it can be adjusted to the correct range by adding 257. In the alternative embodiment, reduction modulo 257 can be performed with a lookup table comprising 65,536 elements, each 8 bits wide.

Multiplication of the two intermediate results is one of many non-linear functions which can be utilized. Other non-linear functions, such as bent functions or permuting byte values before combining them, can also be implemented using lookup tables. The present invention is directed at the use of these various non-linear functions for producing non-linear output.

In the exemplary embodiment, stuttering is also utilized to inject additional non-linearity. The non-linear output derived from the state of the linear feedback shift register as described above may be used to reconstruct the state of the shift register. This reconstruction can be made more difficult by not representing some of the states at the output of the generator, and choosing which in an unpredictable manner. In the exemplary embodiment, the non-linear output is used to determine what subsequent bytes of non-linear output appear in the output stream. When the generator is started, the first output byte is used as the stutter control byte. In the exemplary embodiment, each stutter control byte is divided into four pairs of bits, with the least significant pair being used first. When all four pairs have been used, the next non-linear output byte from the generator is used as the next stutter control byte, and so on.

Each pair of stutter control bits can take on one of four values. In the exemplary embodiment, the action performed for each pair value is tabulated in Table 3.

TABLE 3

| Pair Value | Action of Generator |
|---|---|
| (0, 0) | Register is cycled but no output is produced |
| (0, 1) | Register is cycled and the non-linear output XOR with the constant $(0\ 1\ 1\ 0\ 1\ 0\ 0\ 1)_2$ becomes the output of the generator. Register is cycled again. |
| (1, 0) | Register is cycled twice and the non-linear output becomes the output of the generator. |
| (1, 1) | Register is cycled and the non-linear output XOR with the constant $(1\ 1\ 0\ 0\ 0\ 1\ 0\ 1)_2$ becomes the output of the generator. |

As shown in Table 3, in the exemplary embodiment, when the pair value is (0, 0), the register is cycled once but no output is produced. Cycling of the register denotes the calculation of the next sequence output in accordance with equation (4) and the shifting this new element into the register. The next stutter control pair is then used to determine the action to be taken next.

In the exemplary embodiment, when the pair value is (0, 1) the register is cycled and the non-linear output generated in accordance with equation (5). The non-linear output is XORed with the constant $(0\ 1\ 1\ 0\ 1\ 0\ 0\ 1)_2$ and the result is provided as the generator output. The register is then cycled again. In FIG. 4, the XORed function is performed by XOR gate 66 and the constant is selected by multiplexer (MUX) 64 using the stutter control pair from buffer 70. The output from XOR gate 66 is provided to switch 68 which provides the generator output and the output byte for stutter control in accordance with the value of the stutter control pair. The output byte for stutter control is provided to buffer 70.

In the exemplary embodiment, when the pair value is (1, 0) the register is cycled twice and the non-linear output generated in accordance with equation (5) is provided as the generator output.

In the exemplary embodiment, when the pair value is (1, 1) the register is cycled and the non-linear output generated in accordance with equation (5). The non-linear output is then XORed with the constant $(1\ 1\ 0\ 0\ 0\ 1\ 0\ 1)_2$ and the result is provided as the generator output.

In the exemplary embodiment, the constants which are used in the above steps are selected such that when a generator output is produced, half of the bits in the output are inverted with respect to the outputs produced by the other stutter control pairs. For stutter control pair (1, 0), the non-linear output can be viewed as being XORed with the constant $(0\ 0\ 0\ 0\ 0\ 0\ 0\ 0)_2$. Thus, the Hamming distance between any of the three constants is four. The bit inversion further masks the linearity of the generator and frustrates any attempt to reconstruct the state based on the generator output. The present invention supports a multi-tier keying structure. A stream cipher which supports multi-tier keying structure is especially useful for wireless communication system wherein data are transmitted in frames which may be received in error or out-of-sequence. An exemplary two-tier keying structure is described below.

In the exemplary embodiment, one secret key is used to initialized the generator. The secret key is used to cause the generator to take an unpredictable leap in the sequence. In the exemplary embodiment, the secret key has a length of four to k−1 bytes (or 32 to 128 bits for the exemplary recurrence relation of order 17). Secret keys of less than 4 bytes are not preferred because the initial randomization may not be adequate. Secret keys of greater than k−1 bytes can also be utilized but are redundant, and care should be taken so that a value for the key does not cause the register state to be set to all 0, a state which cannot happen with the current limitation.

Figure 5:
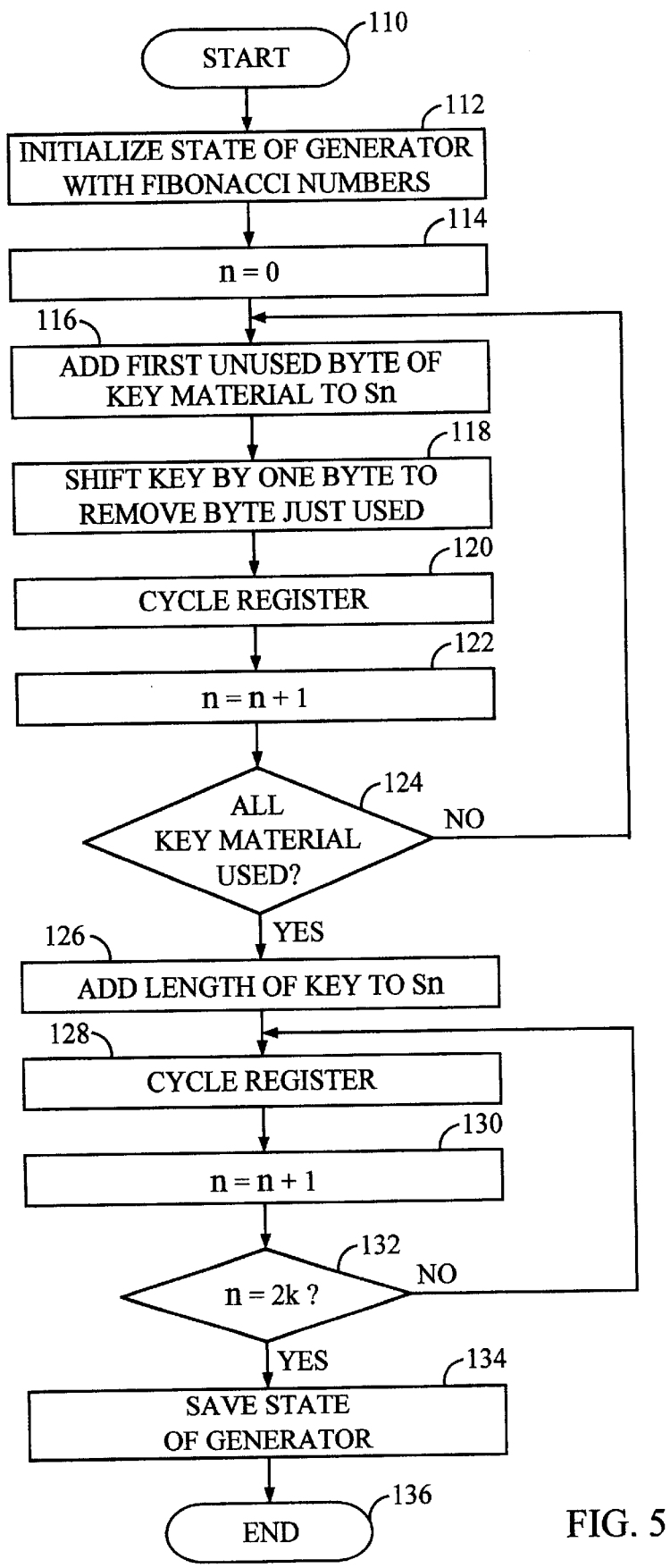
FIG. 5 is a flow diagram of an exemplary secret key initialization process of the present invention.

A flow diagram of an exemplary secret key initialization process is shown in FIG. 5. The process starts at block 110. In the exemplary embodiment, at block 112, the state of the shift register is first initialized with the Fibonacci numbers modulo 256. Thus, elements $S_0, S_1, S_2, S_3, S_4, S_5$, and so on, are initialized with 1, 1, 2, 3, 5, 8, and so on, respectively. Although Fibonacci numbers are used, any set of non-zero numbers which are not linearly related in the Galois field can be used to initialized the register. These numbers should not have exploitable linear relationships which can be used to reconstruct the state of the register.

Next, the loop index n is set to zero, at block 114. The secret key initialization process then enters a loop. In the first step within the loop, at block 116, the first unused byte of the key material is added to $S_n$. Addition of the key material causes the generator to take an unpredictable leap in the sequence. The key is then shifted by one byte, at block 118, such that byte used in block 116 is deleted. The register is then cycled, at block 120. The combination of blocks 116 and 120 effectively performs the following calculation:

$$S_{n+17} = (100 \otimes S_{n+9}) \oplus S_{n+4} \oplus (141 \otimes (S_n \oplus K))$$

where K is the first unused byte of the key material. The loop index n is incremented, at block 122. A determination is then made whether all key material have been used, at block 124. If the answer is no, the process returns to block 116. Otherwise, the process continues to block 126.

In the exemplary embodiment, the length of the key is added to $S_n$, at block 126. Addition of the length of the key causes the generator to take an additional leap in the sequence. The process then enters a second loop. In the first step within the second loop, at block 128, the register is cycled The loop index n is incremented, at block 130, and compared against the order k of the generator, at block 132. If n is not equal to k, the process returns to block 128. Otherwise, if n is equal to k, the process continues to block 134 where the state of the generator are saved. The process then terminates at block 136.

In addition to the secret key, a secondary key can also be used in the present invention. The secondary key is not considered secret but is used in an exemplary wireless telephony system to generate a unique cipher for each frame of data. This ensures that erased or out-of-sequence frames do not disrupt the flow of information. In the exemplary embodiment, the stream cipher accepts a per-frame key, called a frame key, in the form of a 4-octet unsigned integer. The per-frame initialization is similar to the secret key initialization above but is performed for each frame of data. If the use of the stream cipher is such that it is unnecessary to utilize per-frame key information, for example for file transfer over a reliable link, the per-frame initialization process can be omitted.

Figure 6A:
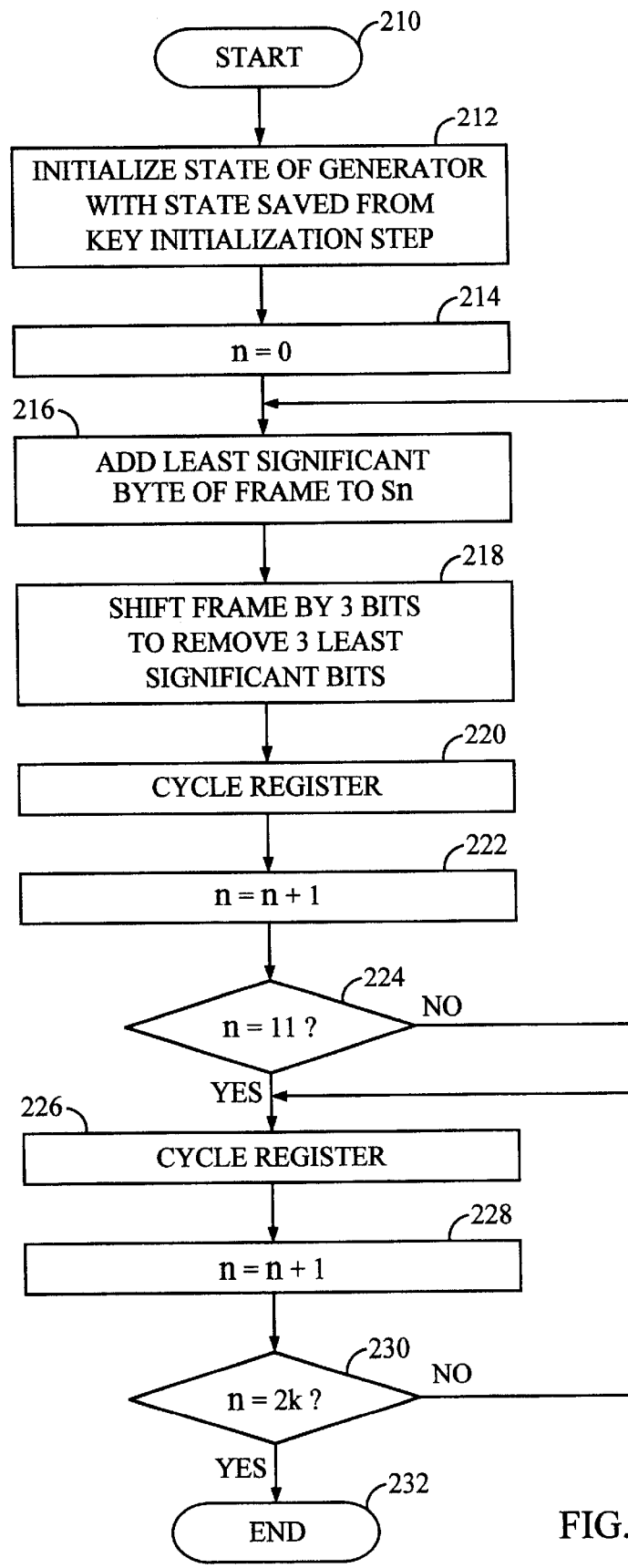
FIG. 6A is a flow diagram of an exemplary per frame initialization process of the present invention.

A flow diagram of an exemplary per-frame initialization process with the frame key is shown in FIG. 6A. The process starts at block 210. In the exemplary embodiment, at block 212, the state of the generator is initialized with the state saved from the secret key initialization process as described above. Next, the loop index n is set to zero, at block 214. The per-frame initialization process then enters a loop. In the first step within the loop, at block 216, the least significant byte of the frame key is added modulo 256 to $S_n$. The frame key is then shifted by three bits, at block 218, such that the three least significant bits used in block 216 are deleted. The register is then cycled, at block 220. In the exemplary embodiment, the loop index n is incremented at block 222 and compared against 11 at block 224. The value of 11, as used in block 224, corresponds to the 32 bits used as the frame key and the fact that the frame key is shifted three bits at a time. Different selections of the frame key and different numbers of bits shifted at a time can result in different comparison values used in block 224. If n is not equal to 11, the process returns to block 216. Otherwise, if n is equal to 11, the process continues to block 226 and the register is cycled again. The loop index n is incremented, at block 228, and compared against 2k, at block 230. If n is not equal to 2k, the process returns to block 226. Otherwise, if n is equal to 2k, the process terminates at block 232.

The present invention has been described for the exemplary Galois finite field having 256 elements. Different finite fields can also be utilized such that the size of the elements matches the byte or word size of the processor used to manipulate the elements and/or the memory used to implement the shift register, or having other advantages. Thus, various finite fields having more than two elements can by utilized and are within the scope of the present invention.

The example shown above utilizes a variety of non-linear processes to mask the linearity of the recurrence relation. Other generators can be design utilizing different non-linear processes, or different combinations of the above described non-linear processes and other non-linear processes. Thus, the use of various non-linear processes to generate non-linear outputs can be contemplated and is within the scope of the present invention.

The example shown above utilizes a recurrence relation having an order of 17 and defined by equation (4). Recurrence relation having other orders can also be generated and are within the scope of the present invention. Furthermore, for a given order, various recurrence relations can be generated and are within the scope of the present invention. In the present invention, a maximal length recurrence relation is preferred for optimal results.

V. A Second Exemplary Stream Cipher Based on LFSR Over $GF(2^8)$

Both the recurrence relation and the non-linear function access elements of the shift register. Just which elements are accessed are chosen so that the distances between the elements form a "full positive difference set" ("On Security of Nonlinear Filter Generators", J. Dj. Golic, in Proceedings of Fast Software Encryption 1996 Cambridge Workshop, Springer-Variag 1996.) These elements are then portioned between the recurrence relation and the nonlinear function to maximize the spread for each. Under these constraints, the present invention can be further developed to enhance cryptographic security and computational efficiency. The second exemplary embodiment provides improved cryptographic security as compared with the first exemplary embodiment.

The LFSR over $GF(2^8)$ is equivalent, mathematically, to eight parallel shift registers over GF(2) of length 136, each with the same recurrence relation. The exemplary embodiment of the present invention includes a recurrence relation over $GF(2^8)$, which is equivalent to a binary recurrence relation whose characteristic polynomial has 51 non-zero coefficients. The three tap positions in the recurrence are determined by the criterion outlined above (i.e., "full positive difference set").

Ideally, the degree 136 polynomial over GF(2), for best strength against cryptanalysis and maximum diffusion, should have approximately half of its coefficients as 1. There are many polynomials over $GF(2^8)$ which have three coefficients which approach this goal, but all three of the coefficients are greater than 1. This means that using such polynomials would require three lookup tables and references, which is less efficient than the current implementation of the present invention. Such polynomials would, however, be perfectly acceptable on the grounds of theoretical security.

With a goal of getting the best possible equivalent binary polynomial while retaining the current structure with a coefficient of 1 (which avoids a multiplication table and lookup), analysis indicates that the use of 65 non-zero binary coefficients can provide a preferred embodiment that nearly achieves the goal of 68 non-zero coefficients. There are 16 polynomials over $GF(2^8)$ meeting these criteria. There are always groups of 8 polynomials over $GF(2^8)$ which have the same equivalent binary polynomial; these are just shifted bit positions in the byte. (Each equivalent binary polynomial can be found, for example, by the Berlekamp-Massey algorithm.) Thus, as shown in Table 4, there are two distinct types of polynomials meeting this criterion. For the second exemplary embodiment of the present invention, the first set of coefficient in Table 4 was

TABLE 4

| | Recurrence Coefficients | | |
|---|---|---|---|
| $S_n$ | $S_{n+4}$ | $S_{n+15}$ | Type |
| 99 | 1 | 206 | 1 |
| 106 | 1 | 201 | 1 |
| 142 | 1 | 126 | 1 |
| 148 | 1 | 214 | 1 |
| 203 | 1 | 146 | 1 |
| 210 | 1 | 19 | 1 |
| 213 | 1 | 195 | 1 |
| 222 | 1 | 136 | 1 |
| 40 | 1 | 109 | 2 |
| 45 | 1 | 38 | 2 |
| 46 | 1 | 159 | 2 |
| 57 | 1 | 129 | 2 |
| 110 | 1 | 209 | 2 |
| 117 | 1 | 63 | 2 |
| 32 | 1 | 219 | 2 |
| 140 | 1 | 97 | 2 |

Figure 7:
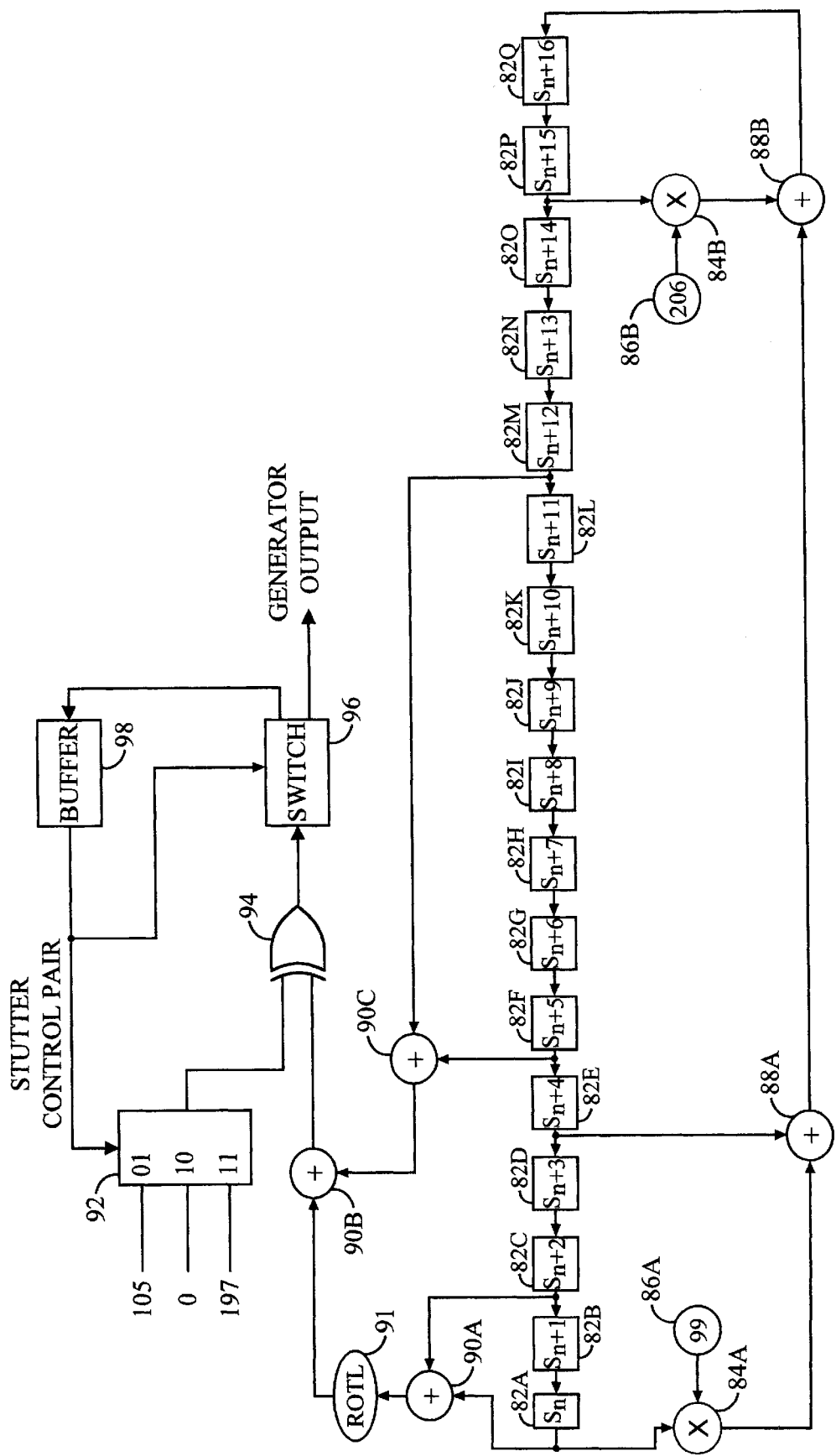
FIG. 7 is a block diagram of a second exemplary stream cipher generator of the present invention.

A block diagram of the second exemplary generator is shown in FIG. 7. In this exemplary embodiment, linear feedback shift register 82 is 17 octets long although other lengths for register 82 (for different order recurrence relation) can be implemented and are within the scope of the present invention. A recurrence relation of order 17 is well suited for applications using up to 128-bit key material. In this exemplary embodiment, linear feedback shift register 82 is updated in accordance with the following recurrence relation:

$$S_{n+17} = (206 \otimes S_{n+15}) \oplus S_{n+4} \oplus (99 \otimes S_n) \tag{8}$$

where the operations are defined over $GF(2^8)$, $\oplus$ is the exclusive-OR operation on two bytes represented by Galois adders 88, and $\otimes$ is a polynomial modular multiplication represented by Galois multipliers 84 (see FIG. 7). In this exemplary embodiment, the modular multiplications on coefficients 86 are implemented using byte table lookups on pre-computed tables as described above. The recurrence relation in equation (8) was chosen to be maximal length.

In this exemplary embodiment, to disguise the linearity of shift register 82, two of the techniques described above are used, namely stuttering and using a non-linear function. Additional non-linear techniques are described elsewhere in the present specification.

In this exemplary embodiment, non-linearity is introduced by combining four of the elements of shift register 82a using a function (or output equation) which is non-linear with respect to the linear operation over $GF(2^8)$. In this exemplary embodiment, the four bytes used are $S_n$, $S_{n+2}$, $S_{n+5}$ and $S_{n+12}$, where $S_n$ is the oldest calculated element in the sequence according to the recurrence relation in equation (8).

Much of the cryptographic security of the present invention comes from the use of the non-linear function to defeat attacks against the stuttering phase so that it is desirable to make this function as strong, that is, as non-linear, as possible.

Numerous possible functions have been tried so as to compare the non-linear function to its nearest linear approximation in each bit position, and calculating the mean absolute deviation and root-mean-square deviation from 0.5, which is the theoretically perfect result. Studies have indicated that superior solutions result from rotating partial sums, a process which has carry effects in the high order bits, so that these bits are combined with the least significant bits of other elements.

On a microprocessor, the addition function will generally accept only two operations at a time, so the best apparent strategy will be to rotate after one intermediate addition. Denoting the rotation operation as ROTL(x), meaning the result of rotating the bits of x to the left by 1 position, a far superior non-linear function is:

$$V_n 32\ ROTL(S_n + S_{n+2}) + S_{n+5} + S_{n+12} \tag{9}$$

Here $V_n$ is the non-linear output and + is addition truncated modulo 256 (with the overflow discarded) represented by arithmetic adders 90. ROTL denotes the rotation operator 91.

An additional rotation after adding $S_{n+5}$ does not appear to yield a better result. As discussed elsewhere in the present specification, using lookup tables which implement explicitly non-linear permutations provides another alternative, but would significantly degrade the computational efficiency of the present invention.

In this exemplary embodiment, the bytes used for recurrence relation (8) comprise $S_n$, $S_{n+4}$, and $S_{n+15}$ and the bytes used for output equation (9) comprise $S_n$, $S_{n+2}$, $S_{n+5}$ and $S_{n+12}$. In this exemplary embodiment, these bytes are selected to have distinct pair distances. For recurrence relation equation (8), the three bytes used have pair distances of 4 (the distance between $S_n$ and $S_{n+4}$), 11 (the distance between $S_{n+4}$ and $S_{n+15}$), and 15 (the distance between $S_n$ and $S_{n+15}$). Similarly, for output equation (9), the four bytes used have pair distances of 2 (the distance between $S_n$ and $S_{n+2}$), 3 (the difference between $S_{n+2}$ and $S_{n+5}$), 5 (the distance between $S_n$ and $S_{n+5}$), 7 (the distance between $S_{n+5}$ and $S_{n+12}$), 10 (the distance between $S_{n+2}$ and $S_{n+12}$), and 12 (the distance between $S_n$ and $S_{n+12}$). The pair distances in recurrence relation (8) (i.e., 4, 11, and 15) are unique (or distinct) within that first respective group and that the pair differences in output equation (9) (i.e., 2, 3, 5, 7, 10, and 12) are also distinct within that second respective group. Furthermore, the pair distances in recurrence relation (8) are distinct from the pair distances in output equation (9). Distinct pair distances ensure that, as shift register 82 shifts, no particular pair of elements of shift register 82 are used twice in either recurrence relation (8) or the non-linear output equation (9). This property removes linearity in the subsequent output equation (9).

In this exemplary embodiment, multiplexer (MUX) 92, XOR gate 94, switch 96, and buffer 98 in FIG. 7 operate in the manner described above for MUX 64, XOR gate 66, switch 68, and buffer 70 in FIG. 4.

Figure 6B:
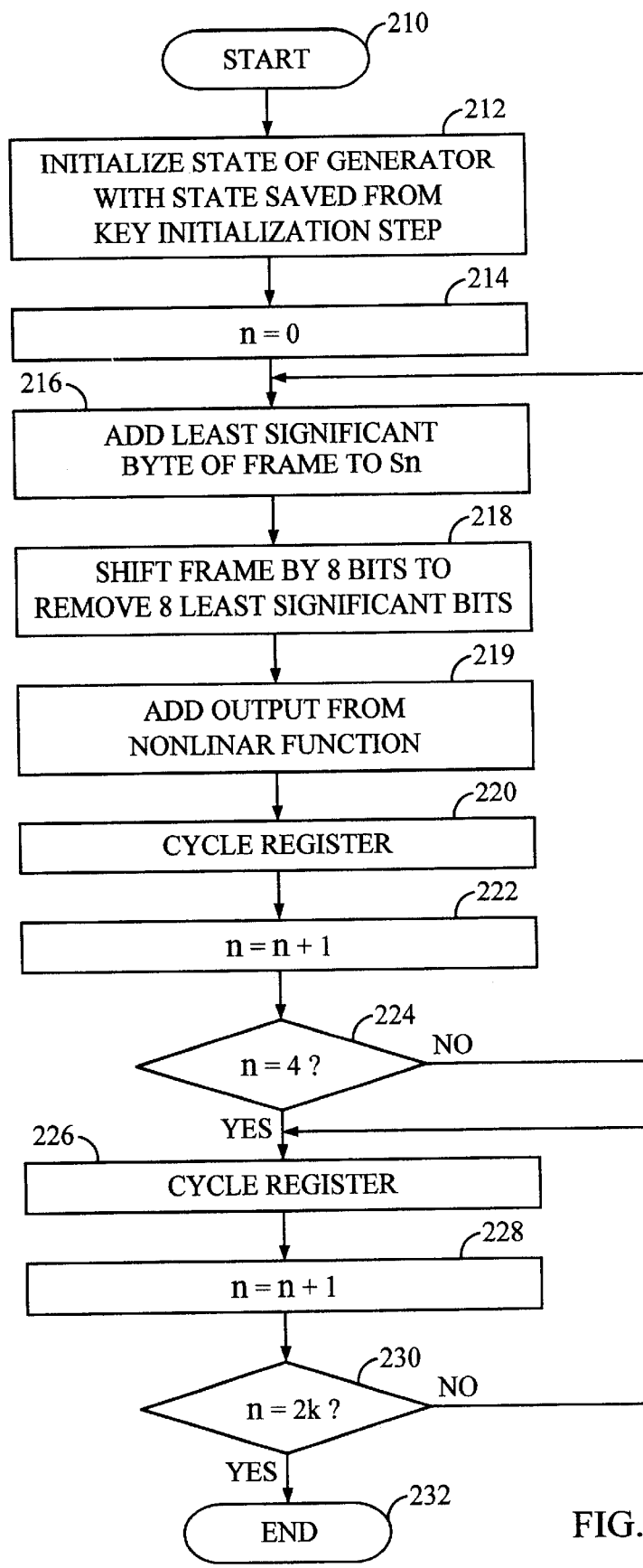
FIG. 6B is a flow diagram of a second exemplary per frame initialization process of the present invention.

A flow diagram of a second exemplary per frame initialization process is shown in FIG. 6B, which is a modification of the flow diagram of FIG. 6A.

This embodiment uses the non-linear function during the secondary key-loading process so as to mix the key information in more quickly than before, thereby allowing a shorter mixing run before generating output. This feature prevents the register state from being a linear subspace of the total set of states of the register.

The key bytes are added in to the $15^{th}$ byte of the register, rather than the zeroth so as to speed diffusion, this being one of the recurrence relation elements. When the "frame" is being loaded, 8 bits are put in at a time. In addition to adding the octet from "frame", this approach also adds the output from "nltap" to the $8^{th}$ byte of the register. After "frame" has been loaded, this approach continues cycling the register and adding the output for some number of cycles.

Thus, in comparing FIG. 6B with FIG. 6A, block 218 is modified so that the frame is shifted by 8 bits to remove the 8 least significant bits. New block 219 adds the output from the non-linear function. And finally the value check in block 224 is changed from 11 to 4.

VI. A Third Exemplary Stream Cipher Based on LFSR Over $GF(2^8)$

As discussed above, the present invention can be further developed to enhance cryptographic security and computational efficiency while maintaining a "full positive difference set." The third exemplary embodiment provides improved computational efficiency as compared with the first exemplary embodiment.

Simpler recurrence relations can be used, at the cost of having simpler binary equivalent polynomials, which may make cryptanalysis easier. Firstly, given the constraints of the full positive difference set, by allowing the coefficients of $S_{n+4}$ and to both be 1, a multiplication table and corresponding table lookup can be avoided. There are 8 such recurrences, with the same equivalent binary polynomial with 35 non-zero coefficients. These have as the coefficients of $S_n$: 40, 45, 46, 57, 110, 117, 132 and 140, respectively.

Even simpler polynomials are possible, if some internal coefficients are permitted to be zero. In this case, not only the multiplication but the entire reference to the extra term can be removed. There are 32 such recurrences; 8 have an equivalent binary polynomial with 11 non-zero coefficients, while the other 24 have three equivalent binary polynomials with 13 non-zero coefficients. Of these, 8 have the coefficient of 1 associated with the $S_{n+1}$ term, while the other 16 have it associated with the $S_{n+4}$ term. The equivalent binary polynomial for the former 8 appears, visually, to have the non-zero coefficients more "spread out" than the others, so for a minimum time implementation of the present invention, those recurrences would be used. The coefficients of the $S_n$ term can be any of 79, 83, 166, 187, 225, 239, 243 and 252. For the third exemplary embodiment of the present invention, the first coefficient was used. The recurrence relation then becomes:

$$S_{n+17} = 79 S_n + S_{n+15}. \tag{11}$$

On a common 8-bit microprocessors, references to the elements of the shift register are relatively expensive. Removing one of these references entirely would seem possible, without effecting the security too much. the element $S_{n+2}$ is chosen to be removed, to "spread" the values as much as possible. It is still advantageous to rotate the intermediate sum however, as the non-linearity of the less significant bits is still not as good as would be desired. In fact, the optimum rotation in this case is by four places. Many microprocessors implement a "nybble-swap" instruction which achieves this operation. Using the notation SWAP( ) to mean rotating the byte by four places, the non-linear function becomes:

$$V_n=\text{SWAP}(S_n+S_{n+5})+S_{n+12} \quad (12)$$

Figure 8:
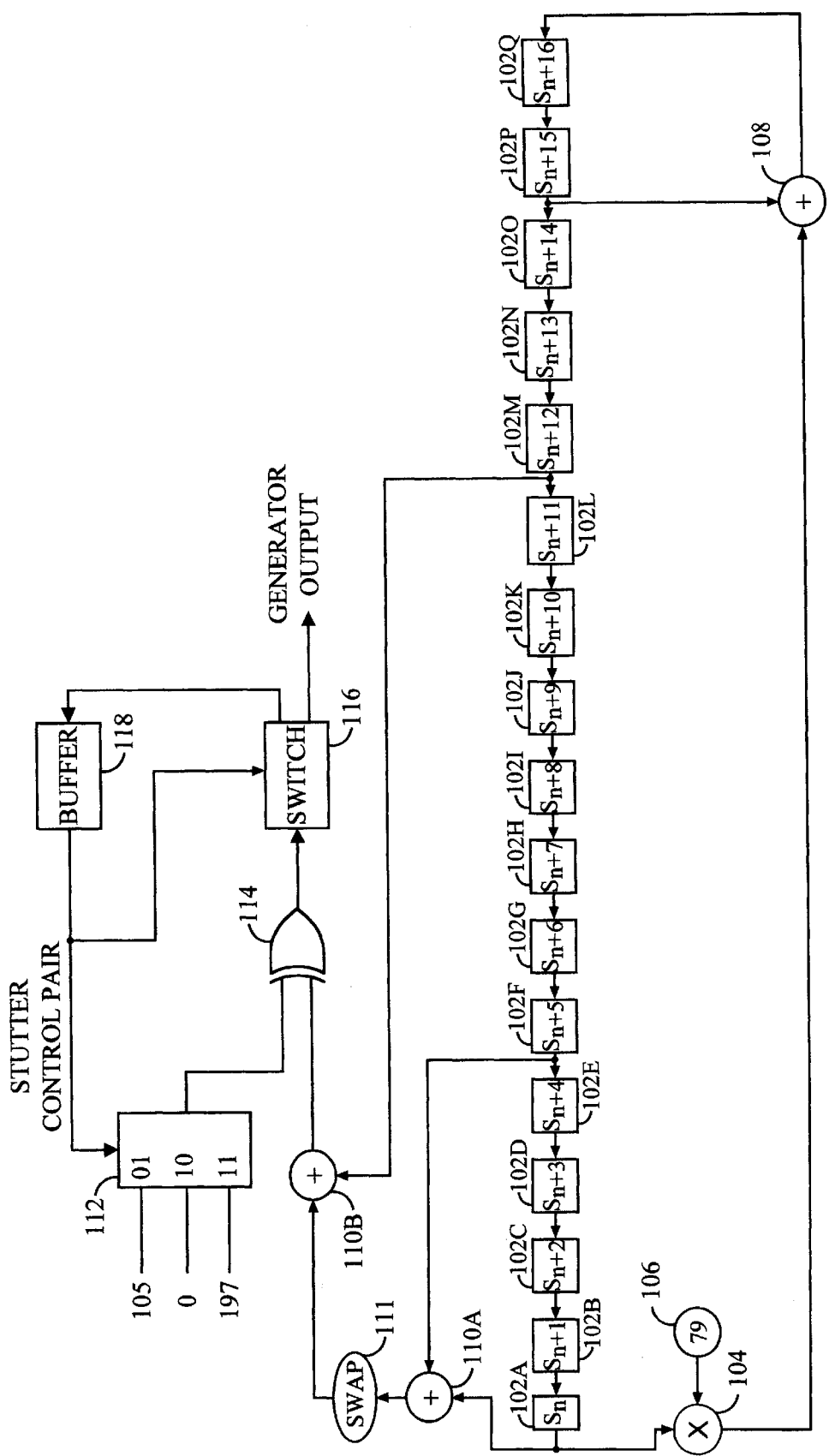
FIG. 8 is a block diagram of a third exemplary stream cipher generator of the present invention.

A block diagram of the third exemplary generator is shown in FIG. 8. In this exemplary embodiment, linear feedback shift register 102 is 17 octets long although other lengths for register 102 (for different order recurrence relation) can be implemented can be used and are within the scope of the present invention. A recurrence relation of order 17 is well suited for applications using up to 128-bit key material. In this exemplary embodiment, linear feedback shift register 102 is updated in accordance with the following recurrence relation (11), where the operations are defined over $GF(2^8)$, $\oplus$ is the exclusive-OR operation on two bytes represented by Galois adders 108, and $\otimes$ is a polynomial modular multiplication represented by Galois multipliers 104. In this exemplary embodiment, the modular multiplications on coefficient 106 are implemented using byte table lookups on pre-computed tables as described above. The recurrence relation in equation (11) was chosen to be maximal length.

Here $V_n$ is the non-linear output and + is addition truncated modulo 256 (with the overflow discarded) represented by arithmetic adders 110. SWAP denotes the swap operator 111.

In this exemplary embodiment, switch 116 and buffer 118 in FIG. 8 operate in the manner described above for switch 68 and buffer 70 in FIG. 4.

During the stuttering phase, the nonlinear outputs are, in two cases, XORed with constant terms. (See Table 3) In this embodiment, these calculations are omitted.

VII. A Method for Using Decimating Stream Cipher Generation in Systems with Real Time Constraints The methods and apparatuses for encrypting data described above are a subset of many stream ciphers which incorporate "stuttering" in their design for security. Other terms which are often used are "irregular decimation" or "clock control". What this means is that the output key stream is generated by ignoring some elements of a larger key stream in a manner which is presumed to be hard to predict. In the case of the algorithms described above, on average 7 cycles of the underlying shift register produce 3 octets of output. Other decimating generators, well known in the art, are the Shrinking Generator (D. Coppersmith et al., "The Shrinking Generator", *Proc. Crypto '93*, Springer-Verlag, 1994.) and the Self-Shrinking Generator (W. Meier and O. Staffelbach, "the Self-Shrinking Generator", *Communications and Cryptography: two sides of one tapestry*, R. E. Blahut et al., eds, Kluwer Academic Publishers, 1994).

In mobile telephony applications, stream ciphers are often used to encrypt relatively small frames of data. The mobile station (cellular phone) usually has a computer with relatively little computational power, to reduce cost and power consumption. There is a fixed amount of time available to the mobile station to encrypt or decrypt a frame of data, before the opportunity to transmit it will pass or the listener will detect a "dropout" in the sound.

The problem with decimating stream ciphers in this context is that the amount of time they take to encrypt data (or, equivalently, the rate of production of the output key stream) is variable. When the amount of data is large, the statistical variation in the total time to generate an equivalent amount of key stream is not significant. However, when the amount of data in each frame is relatively small (i.e. of the same order as the size of the linear feedback shift register described above) the variation in the rate of production of output can be significant. This might cause a situation in which there is insufficient time for the mobile station to perform the encryption or decryption.

The algorithms described above work, in their last stage, by decimating ("stuttering") an output stream produced by the earlier stages. This is done by using one octet of output (the stutter control byte) to determine the behavior of the next four stages. On average, each such byte controls the consumption of 6 values from the earlier stages (minimum 4, maximum 8) and produces 3 output values (minimum 0, maximum 4). Counting the stutter control byte itself, over a long term average, the algorithms described above will produce 3/7N octets of output for N cycles of the underlying register. However, there can be instances where the delay introduced by the decimation can introduce significantly larger delays.

The present invention provides a method of limiting the time taken to encrypt the data by suspending the decimation process before it results in excessive delay. In the first embodiment of the present invention, the encryption system recognizes when the time to encrypt is about to become excessive and produces the rest of the key stream output using a slightly less secure method of generation which produces output at a fixed rate. In an alternative embodiment, the encryption system limits the decimation process to a predetermined number of decimations.

Since these occurrence would be rare, and the conditions under which it happened would be impossible for a cryptanalytic adversary to predict or detect, and with a small amount of output produced with the less secure method, cryptanalysis of the output would still be defeated. The example below shows how this can be done for algorithm provided above, but the concept applies to other clock controlled generators such as the Shrinking Generator referenced above.

In the algorithm, there are two features of the stuttering which cause variability in the rate of key stream output production. In two of four of cases, two register cycles are performed to produce one octet of output. In the remaining two cases, one cycle is performed but an octet of output is produced only half of the time. Therefore, in one fourth of the cases no output is produced at all; the other times an octet of output is produced. On the other hand, the variability in the total number of cycles of the register dominates the overall variability in the duration of the decimation process. In the light of this there are two different methods which can be used to detect the situation where the generator is discarding too many outputs, and hence is taking too long.

1. After initialization, the number of times the generator goes through the case in which it produces no output could be counted. When this count reached a certain threshold, the algorithm would revert to the less secure but more predictable method.

2. After initialization, a counter would count the total number of cycles of the underlying shift register. When this counter reached a (different) threshold, the algorithm would revert to the less secure but more predictable method.

The methods described above use two mechanisms in combination to provide security. One is a non-linear function of the state of the shift register. The other is the stuttering mechanism. For relatively short amounts of output, up to some hundreds of octets, the non-linear function alone should provide adequate security. In the exemplary embodiment, the less secure method for encrypting the data is to simply disable the output stuttering and generate one output from the nonlinear function for each cycle of the underlying register. For other stream ciphers, different methods would need to be adopted. For example, in the Shrinking Generator, a less secure method of generating bits would be to use the output bit from the clock control register to choose which of two successive bits from the other register to use for output. While this fallback scheme is insecure when used by itself, it would be secure enough in this context.

A variation of the first alternative above would be to continuously monitor the number of times no output was produced, and force a single output whenever a predetermined number of cycles which produced no output had occurred. For example, an output could be produced whenever four cycles with no output had been performed. This would guarantee a particular bound on the rate of output production, which could never fall below one output for every four iterations of the algorithm. (This can also be viewed as a slightly more complicated stuttering method to the one mentioned above.)

It is necessary that the key stream generators at each end have the same configuration parameters, and revert to the less secure method at the same time.

The parameters for the reversion should be chosen so that the probability that a given frame would be less strongly encrypted would be very small, say 1 in $10^4$ or less. The parameters could be derived mathematically from the known characteristics of a given cipher, or determined by simulation. This would simultaneously ensure that the amount of data encrypted using the less secure method would be quite small. In the exemplary embodiment, at 104 register cycles the ciphering system reverts to the less secure cipher. Using the ciphering system described above, this would mean that less than one in 10,000 frames would revert to less secure encryption, and of those, only about 1 in 100 would produce 6 or more octets of output using the less secure method (this estimate based on the number of octets expected to be produced in getting from 104 cycles to 116 cycles). It is extremely unlikely that such an occurrence could be detected by cryptanalysis, since any stream of 6 octets would represent less than half of the state of the register, and would be equally likely to occur through random chance during normal operation.

Figure 9:
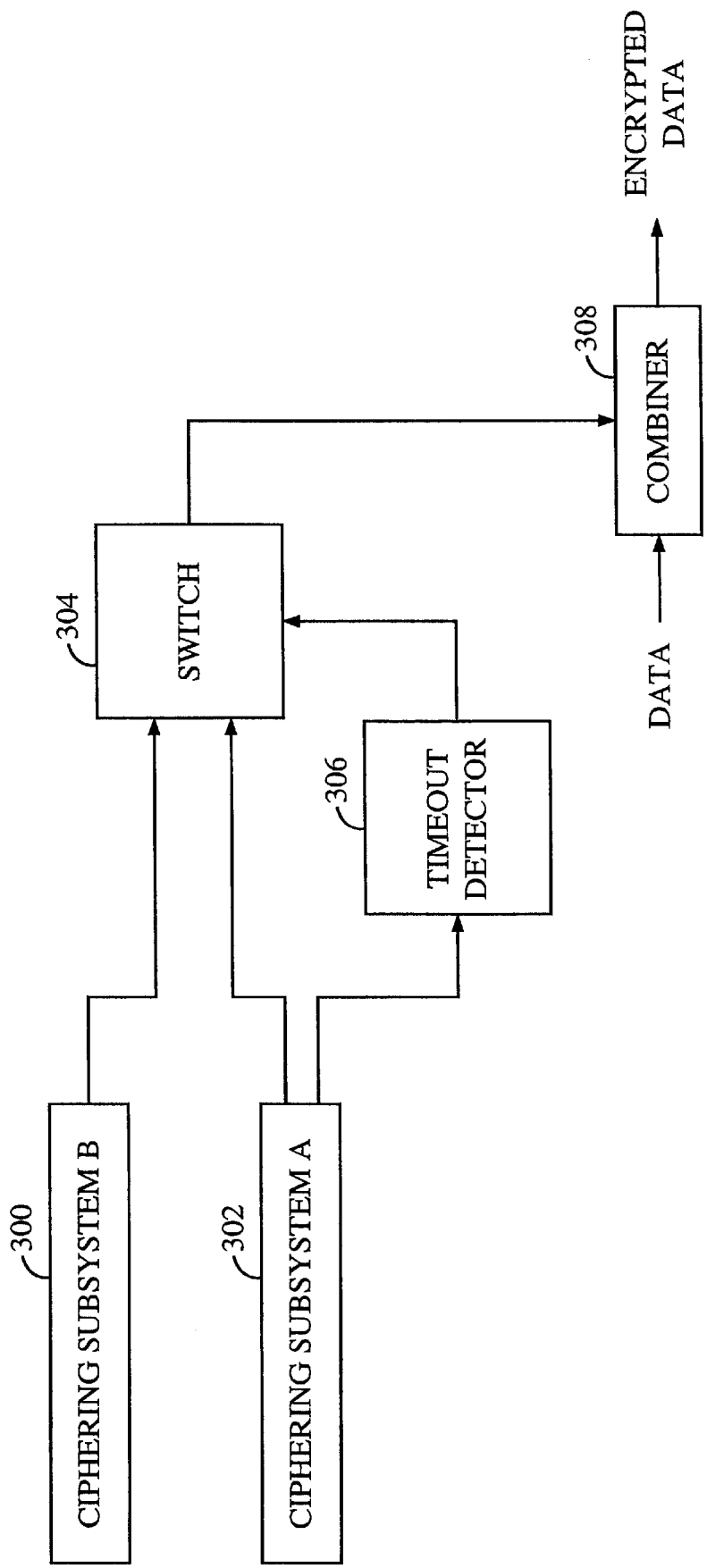
FIG. 9 is a block diagram illustrating a general implementation of the present invention for limiting the ciphering delay.

Referring to FIG. 9, a ciphering system that limits the delay in the ciphering process is illustrated. Ciphering subsystem A rforms the preferred ciphering operation. That is, ciphering subsystem A 302 provides greater security than does the ciphering operation performed by ciphering subsystem B 300. However, the ciphering operation performed by ciphering subsystem B 300 can be performed with less delay than the ciphering operation performed by ciphering subsystem 302.

Information about the key stream provided by ciphering subsystem A 302 is provided to timeout detector 306 which monitors the time it takes to generate consecutive portions of the key stream or in the alternative monitors the accumulated time to encrypt a frame of data. When the time to generate consecutive portions of the key stream from ciphering subsystem A 302 or the accumulated time to encrypt part of a frame of data passes a predetermined threshold, timeout detector 306 sends a signal to switch 304 indicating that switch 300 should use the key stream provided by ciphering subsystem B 300 instead of the key stream provided by ciphering subsystem A 320.

The key stream selected by switch 304 is provided to a first input of combiner 308. Combiner 308 combines the data to be encrypted with the selected key stream and outputs the encrypted data.

Figure 10:
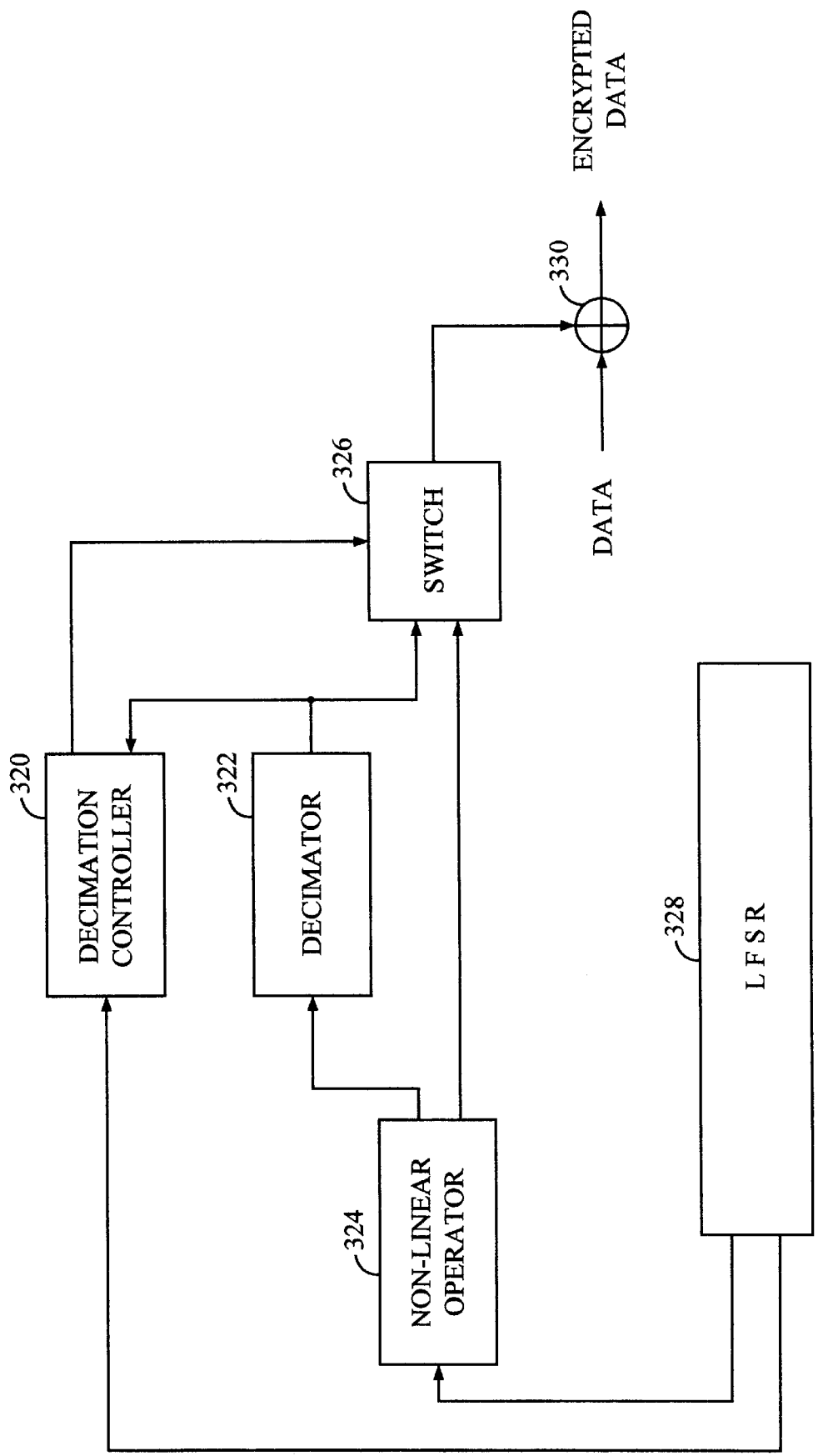
FIG. 10 is a block diagram illustrating a general implemention of the present invention for limiting the ciphering delay in an encryption cipher employing random decimation or stuttering.

FIG. 10 illustrates a particular implementation of the invention illustrated in FIG. 9. In the particular implementation illustrated in FIG. 10, the preferred ciphering operation generates the key stream in accordance with a linear operation, a non linear operation and a randomized decimation operation. When the decimation process threatens to cause excessive delay in the ciphering process, it is switched out of the operation.

In FIG. 10, the linear portion of the ciphering process is performed by linear feedback shift register (LFSR) 328, the implementation of which is well known in the art and of which particular implementations are described above. Linear feedback shift register 328 provides its output and a set of the register contents to non linear operator processor 324. Non linear operator processor 324 performs a non linear process upon the output of linear feedback shift register 328 and the register contents provided by linear feedback shift register 328 and outputs the result of the non linear operation to decimator 322 and switch 326.

Decimator 322 performs a randomized decimation upon the output from non linear operator 324 which deletes portions of the data provided by nonlinear operator 324 in accordance with pseudorandom selection process and provides the randomly decimated data stream to switch 326.

Under normal operation, switch 326 outputs the decimated key stream from decimator 322 to exclusive-OR gate 330. However, when decimation controller 320 detects that the decimation process threatens to cause excessive delay ciphering of the data, decimation controller 320 sends a signal to switch 326 which in response outputs the key stream provided from non linear operator processor 324 without decimation. In the exemplary embodiment, decimation controller 320 detects that the decimation process is becoming excessive either by counting the number of shifts of linear feedback shift register 328 or by counting the amount of decimation being provided by decimator 322. The number of shifts of linear feedback shift register 328 or number of outputs from nonlinear operator 324 that are decimated by decimator 322 are used by decimator controller 320 to determine when the decimation process is becoming excessive.

Figure 11:
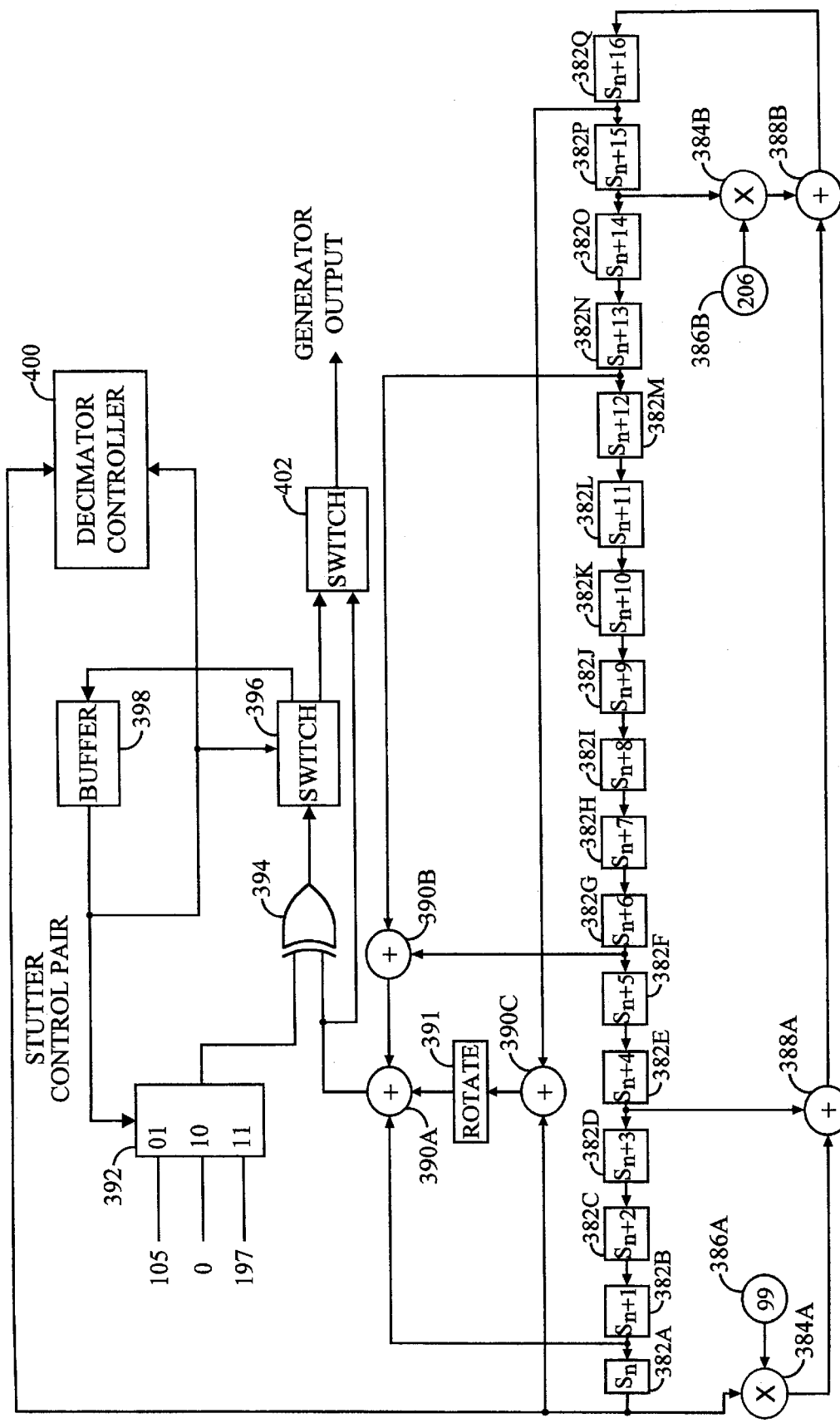
FIG. 11 is a block diagram illustrating a general implemention of the present invention for limiting the ciphering delay in an encryption cipher employing random decimation or stuttering as a modified version of FIG. 7.

A block diagram of the present embodiment is illustrated in FIG. 11. FIG. 11 is modified version of the generator illustrated in FIG. 7 with the incorporation of a means for limiting the ciphering delay. In this exemplary embodiment, linear feedback shift register 382 is 17 octets long although other lengths for register 382 (for different order recurrence relation) can be implemented and are within the scope of the present invention. A recurrence relation of order 17 is well suited for applications using up to 128-bit key material. In this exemplary embodiment, linear feedback shift register 382 is updated in accordance with the following recurrence relation:

$$S_{n+17} = (206 \otimes S_{n+15}) \oplus S_{n+4} \oplus (99 \otimes S_n) \qquad (13)$$

where the operations are defined over $GF(2^8)$, $\oplus$ is the exclusive-OR operation on two bytes represented by Galois adders 388, and $\otimes$ is a polynomial modular multiplication represented by Galois multipliers 384. In this exemplary embodiment, the modular multiplications on coefficients 386 are implemented using byte table lookups on pre-computed tables as described above. The recurrence relation in equation (13) was chosen to be maximal length.

In this exemplary embodiment, to disguise the linearity of shift register 382, two of the techniques described above are used, namely stuttering and using a non-linear function. Additional non-linear techniques are described elsewhere in the present specification.

In this exemplary embodiment, non-linearity is introduced by combining four of the elements of shift register 382 a using a function (or output equation) which is non-linear with respect to the linear operation over $GF(2^8)$. In this exemplary embodiment, the four bytes used are $S_n$, $S_{n+2}$, $S_{n+5}$ and $S_{n+12}$, where $S_n$ is the oldest calculated element in the sequence according to the recurrence relation in equation (13).

Much of the cryptographic security of the present invention comes from the use of the non-linear function to defeat attacks against the stuttering phase so that it is desirable to make this function as strong, that is, as non-linear, as possible.

Numerous possible functions have been tried so as to compare the non-linear function to its nearest linear approximation in each bit position, and calculating the mean absolute deviation and root-mean-square deviation from 0.5, which is the theoretically perfect result. Studies have indicated that superior solutions result from rotating partial sums, a process which has carry effects in the high order bits, so that these bits are combined with the least significant bits of other elements.

On a microprocessor, the addition function will generally accept only two operations at a time, so the best apparent strategy will be to rotate after one intermediate addition. Denoting the rotation operation as ROTL(x), meaning the result of rotating the bits of x to the left by 1 position, a far superior non-linear function is:

$$V_n = ROTL(S_n + S_{n+16}) + S_{n+1} + S_{n+6} + S_{n+13} \quad (14)$$

Here $V_n$ is the non-linear output and + is addition truncated modulo 256 (with the overflow discarded) represented by arithmetic adders 390. ROTL denotes the rotation operator 391.

An additional rotation after adding $S_{n+5}$ does not appear to yield a better result. As discussed elsewhere in the present specification, using lookup tables which implement explicitly non-linear permutations provides another alternative, but would significantly degrade the computational efficiency of the present invention.

In this exemplary embodiment, the bytes used for recurrence relation (13) comprise $S_n$, $S_{n+4}$, and $S_{n+15}$ and the bytes used for output equation (14) comprise $S_n$, $S_{n+1}$, $S_{n+6}$, $S_{n+13}$ and $S_{n+16}$. In this exemplary embodiment, these bytes are selected to have distinct pair distances. For recurrence relation equation (13), the three bytes used have pair distances of 4 (the distance between $S_n$ and $S_{n+4}$), 11 (the distance between $S_{n+4}$ and $S_{n+15}$), and 15 (the distance between $S_n$ and $S_{n+15}$). Similarly, for output equation (14), the five bytes used have pair distances of 1 (the distance between $S_n$ and $S_{n+1}$), 3 (the difference between $S_{n+13}$ and $S_{n+16}$), 5 (the distance between $S_{n+1}$ and $S_{n+6}$), 6 (the distance between $S_n$ and $S_{n+6}$), 7 (the distance between $S_{n+6}$ and $S_{n+13}$), 10 (the distance between $S_{n+6}$ and $S_{n+16}$), 12 (the distance between $S_{n+1}$ and $S_{n+13}$), 13 (the distance between $S_n$ and $S_{n+13}$), 15 (the distance between $S_{n+1}$ and $S_{n+16}$), and 16 (the distance between $S_n$ and $S_{n+16}$). The pair distances in recurrence relation (13) (i.e., 4, 11, and 15) are unique (or distinct) within that first respective group and that the pair differences in output equation (14) (i.e., 1, 3, 5, 6, 7, 10, 12, 13, 15, and 16) are also distinct within that second respective group. Furthermore, the pair distances in recurrence relation (13) are distinct from the pair distances in output equation (14) except for one pair distance, 15. Distinct pair distances ensure that, as shift register 382 shifts, no particular pair of elements of shift register 382 are used twice in either recurrence relation (13) or the non-linear output equation (14). This property removes linearity in the subsequent output equation (14).

In this exemplary embodiment, multiplexer (MUX) 392, XOR gate 394, switch 396, and buffer 398 in FIG. 11 operate in the manner described above for MUX 64, XOR gate 66, switch 68, and buffer 70 in FIG. 4.

The decimated key sequence from switch 396 and the output from summer 390b are provided to switch 402. Under normal operation, switch 402 outputs the decimated key sequence from switch 396. However, should decimation controller 400 detect that the ciphering process is introducing an excessive delays due to the variability of the decimation process, then decimation controller 400 sends a signal to switch 402 which cause switch 402 to output the undecimated sequence. The output of switch 402 is combined with the data sequence to provide the encrypted data.

In the exemplary embodiment, decimation controller 400 detects that the ciphering delay is excessive by either counting the number of outputs from buffer 398 indicative gating those portion of the keystream output by adder 390b or by counting the number of shifts by shift register 382. Other methods of determining the delay introduced by the stuttering process are equally applicable and covered under the scope of the present invention.

The receiver of the encrypted data. must know when to switch between the decimated key sequence output by switch 396 and the undecimated sequence output by summing element 390b. In the exemplary embodiment, the receiver also includes an identical decimation controller 400 and switch 402 and will switch between the decimated and undecimated sequences in the identical manner as at the transmitter of the encrypted data. Thus, no explicit indication of the time of changing between the decimated and undecimated key sequences is necessary.

A flow diagram of a second exemplary per frame initialization process is shown in FIG. 6B, which is a modification of the flow diagram of FIG. 6A.

This embodiment uses the non-linear function during the secondary key-loading process so as to mix the key information in more quickly than before, thereby allowing a shorter mixing run before generating output. This feature prevents the register state from being a linear subspace of the total set of states of the register.

The key bytes are added in to the $15^{th}$ byte of the register, rather than the zeroth so as to speed diffusion, this being one of the recurrence relation elements. When the "frame" is being loaded, 8 bits are put in at a time. In addition to adding the octet from "frame", this approach also adds the output from "nltap" to the $8^{th}$ byte of the register. After "frame" has been loaded, this approach continues cycling the register and adding the output for some number of cycles.

Thus, in comparing FIG. 6B with FIG. 6A, block 218 is modified so that the frame is shifted by 8 bits to remove the 8 least significant bits. New block 219 adds the output from the non-linear function. And finally the value check in block 224 is changed from 11 to 4.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for encrypting data comprising:

first generator for generating a first key stream;

second generator for generating a second key stream;

combiner for receiving said first key stream and said data and for combining said first key stream and said data to provide encrypted data; and delay measurement means for measuring the delay in the generation of said first key stream by said first generator;

wherein said combiner is further for receiving said second key stream and said data and for combining said. second key stream and said data to provide encrypted data when said measured delay exceeds a predetermined threshold.

2. The apparatus of claim 1 wherein said first generator generates said first key stream in accordance with a predetermined decimation algorithm.

3. The apparatus of claim 1 wherein said first generator comprises:

linear generator means for generating a random sequence of symbols in accordance with a linear generating format;

non linear generator for performing a non linear operation on said random sequence of symbols to provide a second random sequence of symbols; and pseudorandom decimator for gating out portions of said second random sequence of symbols.

4. The apparatus of claim 3 wherein said second generator comprises:

linear generator means for generating a random sequence of symbols in accordance with a linear generating format; and non linear generator for performing a non linear operation on said random sequence of symbols to provide a second random sequence of symbols.

5. The method of claim 1 wherein said first generator is defined by a recurrence relation with an order of 17.

6. The apparatus of claim 3 wherein said first generator generates said first random sequence in accordance with the recurrence relation $S_{n+17}=(206 \otimes S_{n+15}) \oplus S_{n+4} \oplus (99 \otimes S_n)$, where the operations are defined over $GF(2^8)$, $\oplus$ is the exclusive-OR operation on two bytes, and $\otimes$ is a polynomial modular multiplication.

7. The apparatus of claim 3 wherein said linear generator is implemented with a linear feedback shift register.

8. The apparatus of claim 7 wherein said delay measurement means measures the number of shifts of said linear feedback shift register.

9. The apparatus of claim 7 wherein said delay measurement means measures the number of portions of said second random sequence of symbols gated out by said pseudorandom decimator.

10. The apparatus of claim 8 wherein said linear feedback shift register is implemented with a sliding window.

11. A method for encrypting data comprising:

generating a first key stream;

generating a second key stream;

combining said first key stream and said data to provide encrypted data;

measuring the delay in generating said first key stream; and combining said second key stream and said data to provide encrypted data when said measured delay exceeds a predetermined threshold.

12. The method of claim 11 wherein said step of generating said first key stream is performed in accordance with a predetermined decimation algorithm.

13. The method of claim 11 wherein said step of generating said first key stream comprises the steps of:

generating a random sequence of symbols in accordance with a linear generating format;

performing a non linear operation on said random sequence of symbols to provide a second random sequence of symbols; and gating out portions of said second random sequence of symbols.

14. The method of claim 13 wherein said step of generating said second key stream comprises the steps of:

generating a random sequence of symbols in accordance with a linear generating format; and performing a non linear operation on said random sequence of symbols to provide a second random sequence of symbols.

15. The method of claim 13 wherein said linear generating format has an order of 17.

16. The method of claim 13 wherein said step of generating said first random sequence of symbols in accordance with a linear generating format generates said first random sequence in accordance with the recurrence relation $S_{n+17}=(206 \otimes S_{n+15}) \oplus S_{n+4} \oplus (99 \otimes S_n)$, where the operations are defined over $GF(2^8)$, $\oplus$ is the exclusive-OR operation on two bytes, and $\otimes$ is a polynomial modular multiplication.

17. The method of claim 13 wherein said step of generating said first random sequence is implemented with a linear feedback shift register.

18. The method of claim 17 wherein said step of measuring said delay is performed by counting the number of shifts of said linear feedback shift register.

19. The method of claim 17 wherein said measuring said delay counts the number of portions of said second random sequence of symbols gated out by said pseudorandom decimator.

20. The method of claim 18 wherein said linear feedback shift register is implemented with a sliding window.

* * * * *